United States Patent [19]

Tsuji et al.

[11] Patent Number: 5,351,102
[45] Date of Patent: Sep. 27, 1994

[54] FILM APPARATUS HAVING MAGNETIC RECORDING SURFACE

[75] Inventors: Sadafusa Tsuji, Tondabayashi; Manabu Inoue, Kobe; Shigeru Wada, Kishiwada; Michihiro Iwata, Sakai, all of Japan

[73] Assignee: Minolta Camera Kabushiki Kaisha, Osaka, Japan

[21] Appl. No.: 99,311

[22] Filed: Jul. 30, 1993

Related U.S. Application Data

[62] Division of Ser. No. 680,734, Apr. 5, 1991, Pat. No. 5,258,793.

[30] Foreign Application Priority Data

| Apr. 6, 1990 | [JP] | Japan | 2-92579 |
| Jul. 27, 1990 | [JP] | Japan | 2-199687 |
| Jul. 27, 1990 | [JP] | Japan | 2-199688 |

[51] Int. Cl.⁵ ............................ G03B 17/24
[52] U.S. Cl. ........................ 354/106; 354/173.1
[58] Field of Search ............ 354/75, 76, 105, 106, 354/173.1, 173.11

[56] References Cited

U.S. PATENT DOCUMENTS

| 4,841,319 | 6/1989 | Hansen | 354/275 |
| 4,870,437 | 9/1989 | Omaki et al. | 354/64 |
| 4,996,546 | 2/1991 | Pagano et al. | 354/76 |
| 5,049,914 | 9/1991 | Dassero | 354/288 |
| 5,220,371 | 6/1993 | Tanii et al. | 354/212 |

FOREIGN PATENT DOCUMENTS

| 53-145837 | 11/1978 | Japan . |
| 55-46732 | 4/1980 | Japan . |
| 57-5619 | 2/1982 | Japan . |
| 57-13542 | 3/1982 | Japan . |
| 57-22171 | 5/1982 | Japan . |
| 2-113240 | 4/1990 | Japan . |
| 2-151844 | 6/1990 | Japan . |

Primary Examiner—Howard B. Blankenship
Attorney, Agent, or Firm—Burns, Doane, Swecker & Mathis

[57] ABSTRACT

A camera using a film having a magnetic surface for recording magnetic data thereon. The camera includes a magnetic head for writing magnetic data onto the magnetic surface and for reading magnetic data recorded thereon. A pad movable with respect to the magnetic head is opposed to the magnetic head. The film is sandwiched between the pad and the magnetic head when magnetic data is written onto the magnetic surface of the film and the magnetic data recorded thereon is read. The pad is driven by a motor for driving a film feeding mechanism so that the pad moves away from the film feeding path when data writing and data reading is not carried out. A planetary gear mechanism connects the motor selectively to a pad driving mechanism and a film feeding mechanism.

4 Claims, 21 Drawing Sheets

FILM APPARATUS HAVING MAGNETIC RECORDING SURFACE

This application is a divisional of application Ser. No. 07/680,734, filed Apr. 5, 1991, now U.S. Pat. No. 5,258,793.

BACKGROUND OF THE INVENTION

1. Field of the Invention

The present invention relates to a camera and more particularly to a camera in which information such as photographing information can be recorded on a film as magnetic data or the camera using a film cartridge which accommodates a film in a light-intercepted condition.

2. Description of the Related Arts

U.S. Pat. No. 4,482,924 and Japanese Patent Laid-Open Application No. 60-17447 disclose a film having a magnetic material applied to the back surface thereof so that data such as photographing information and the trimming information of a pseudo focal length photographing can be magnetically recorded during a photographing operation. A camera using this kind of film contains a magnetic head for recording data on the magnetic surface formed on the film and a pad for sandwiching the film between the magnetic head and the pad.

In initial film loading of the camera, the leading end portion of the film strip is wound by the spool provided in the camera. In a camera in which magnetic data is recorded on the magnetic surface of the film, it is necessary to pass the film between the magnetic head and the pad. Particularly in a camera in which the film is automatically loaded, in order to reliably pass the film strip between the magnetic head and the pad, it is preferable to move the magnetic head and the pad away from the film feeding path and keep them in contact with the film when magnetic data is written onto the magnetic surface of the film or data recorded thereon is read. In order to keep the film surface properly oriented during a shutter release operation, it is also preferable that neither the magnetic head nor the pad is in contact with the film. In order to prevent the magnetic material on the film surface from being transferred to the magnetic head, preferably, the magnetic head should be spaced from the film except when data is written onto the magnetic surface of the film or data recorded thereon is read.

It is necessary to provide the camera with a mechanism for effectively moving the magnetic head and the pad with respect to the film feeding path. Preferably, the mechanism is constructed in consideration of the miniaturization of the camera and cost reduction.

In a camera into which the film is automatically loaded, it is unnecessary to pull out the leading end portion of the film strip from a film patrone or a film cartridge. That is, after the patrone or the cartridge is inserted into the camera body, the film is automatically loaded. In a camera in which the patrone or the cartridge is inserted into the camera body or taken out therefrom along the axis of the spool of the patrone or the cartridge, mostly, the cover of the cartridge chamber is positioned on the bottom surface of the camera body. In taking out the cartridge from the cartridge chamber, the cover is opened with the camera body inverted and then, the camera is turned again so that the cartridge slips out of the cartridge chamber.

In a more complex camera, the cartridge chamber includes a mechanism for ejecting the cartridge. The mechanism projects the bottom portion of the cartridge from the cartridge chamber when the cover is opened with the camera body turned upside down.

The camera containing the ejecting mechanism is large-sized and its cost of production is high. Additionally the ejecting mechanism causes a user to take out the cartridge inconveniently from the cartridge chamber.

Since the cover is positioned on the bottom portion of the camera body, unless the cover of the cartridge chamber is opened with the camera turned upside down, the cartridge drops from the cartridge chamber as soon as the cover is opened. Accordingly, it is preferable to provide a mechanism in which the cover cannot be opened unless the camera body is turned upside down.

SUMMARY OF THE INVENTION

Accordingly, it is an essential object of the present invention to provide a camera having a miniaturized mechanism for operating a magnetic head and a pad provided therein to record magnetic data on the magnetic surface of a film.

It is another object of the present invention to provide a camera having a simple construction in which the film cartridge can be easily taken out from the cartridge chamber without employing a cartridge ejecting mechanism.

It is still another object of the present invention to provide a camera in which the cover cannot be opened unless the entrance/exit of the cartridge chamber is upward.

A camera according to an embodiment using a film having a magnetic surface for recording magnetic data thereon comprises: a magnetic head for writing magnetic data onto the magnetic surface or for reading the magnetic data recorded on the magnetic surface; a pad relatively movable with respect to the magnetic head so that the film can be inserted between the magnetic head and the pad; driving means for generating a driving force for feeding the film between the magnetic head and the pad; urging means for urging at least one of the magnetic head and the pad in a direction in which the magnetic head and the pad depart relatively from each other; and control means, energized by the driving force generated by said driving means, for reducing an interval between the magnetic head and the pad against the urging force of the urging means so that the film is sandwiched between the magnetic head and the pad.

Normally, a camera of the above construction comprises a mechanism in which the magnetic head is stationary at a position away from the film feeding path and the pad is movable with respect thereto. Thus, the magnetic surface of the film is pressed against the magnetic head or released therefrom. Except when the magnetic data is written onto the magnetic surface or magnetic data is read therefrom, the urging means moves the pad away from the film feeding path.

If the pad is stationary and the magnetic head is movable, the urging means moves the magnetic head to a position at which the magnetic head is nonoperable.

If the magnetic head and the pad are movable, the urging means moves each to a nonoperable position. Thus, the film does not contact either the magnetic head or the pad when data writing or data reading is not carried out.

As apparent from the above, except when data writing or data reading is carried out, the interval between the magnetic head and the pad is maintained. Therefore, the film is capable of passing therebetween. When the film is initially loaded in an automatic operation, the leading end portion of the film is capable of reliably passing therebetween, which prevents the occurrence of a loading error. Since the magnetic surface of the film does not contact the magnetic head for a long time, the transfer of the magnetic material on the magnetic surface to the magnetic head can be prevented.

The mechanism for moving the pad into the film feeding path employs the driving motor for feeding the film as a driving means for itself. That is, the mechanism for transmitting the force of the driving means can be selectively connected to the film feeding mechanism and the pad driving mechanism. Further, the mechanism transmits the force of the driving means to the film feeding mechanism and the pad driving mechanism simultaneously. Therefore, the pad can be moved to a position at which it can operate. The two mechanisms are driven by one motor which occupies a large area in the camera body, which prevents the camera from being miniaturized.

Since the electromagnet keeps the pad located at the operable position, the mechanism for driving the pad operates only when it moves the pad to the operable position. Upon deenergization of the electromagnet, the urging means returns the pad to the nonoperable position by its urging force. If the battery voltage drops or the battery is taken out of the camera body, the pad is returned to the nonoperable position even though the pad is at the operable position. The camera may be miniaturized because a small electromagnet is used.

A camera, according to another embodiment, using a film cartridge in which a photographing film is wound on a spool of the film cartridge and accommodated in a shell of the film cartridge in a light-intercepted condition comprises: a cartridge chamber having an opening for allowing the film cartridge to pass therethrough along an axis of the spool; and a cover for opening and closing the opening having a configuration for covering, with a predetermined height, the periphery of an end portion of the film cartridge accommodated in the cartridge chamber in an axial direction of the spool when the cover is closed; whereby said periphery of the end portion of the film cartridge is exposed when the cover is opened.

According to the above construction, a user can take out the film cartridge from the cartridge chamber by picking it out without turning the opening of the cartridge chamber downward after opening the cover. This construction eliminates the need for the provision of a cartridge ejecting mechanism.

A camera, according to another embodiment, using a film cartridge, in which a photographing film is wound on a spool of the film cartridge and accommodated in a shell of the film cartridge in a light-intercepted condition comprises: a cartridge chamber having an opening for allowing the film cartridge to pass therethrough along an axis of the spool; a cover movable to open and close the opening of the cartridge chamber; and means for restraining the cover from being opened when the opening is downward.

According to the above construction, the user can open the cover only when the opening of the cartridge chamber is upward pointed. Accordingly, the user can prevent the cartridge from dropping from the cartridge chamber even though the user is not accustomed to camera handling.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 18(a), 18(b), 18(c) through FIG. 20 are flowcharts showing the subroutine of the pre-winding operation of the camera according to the embodiment;

DETAILED DESCRIPTION OF THE INVENTION

A magnetic data recording camera according to the embodiment automatically carries out the initial loading of a film. The camera uses a film cartridge which can feed out the film from a shell of the film cartridge for automatic loading, the details of which will be described later. The film has a magnetic surface to which various magnetic data is recorded. The magnetic surface extends in one of the edge portions of the rear side of the film. The camera includes a pre-winding system and has a magnetic head for reading the magnetic data of the film in performing the pre-winding operation. The magnetic head is positioned a certain distance away from the film traveling surface such that the magnetic head is opposed to the rear side of the film. A pad is provided with the film sandwiched between the pad and the magnetic head so as to bring the film into contact with the magnetic head when the writing and reading of the magnetic data is executed. That is, the pad contacts the magnetic head and moves away from it.

The camera has a pseudo focal length photographing function for writing trimming information indicating a desired angle of view to the magnetic surface by means of the magnetic head when a printing is made so that a picture plane is trimmed at an angle of view as though photographing is carried out using a zoom lens. The magnetic head serves as a means for reading magnetic data when a pre-winding operation is carried out. According to the pseudo focal length photographing function, the finder optical system includes a zooming mechanism so that an image in a view finder allows a photographer to recognize the angle of view of a developed picture.

Figure 1:
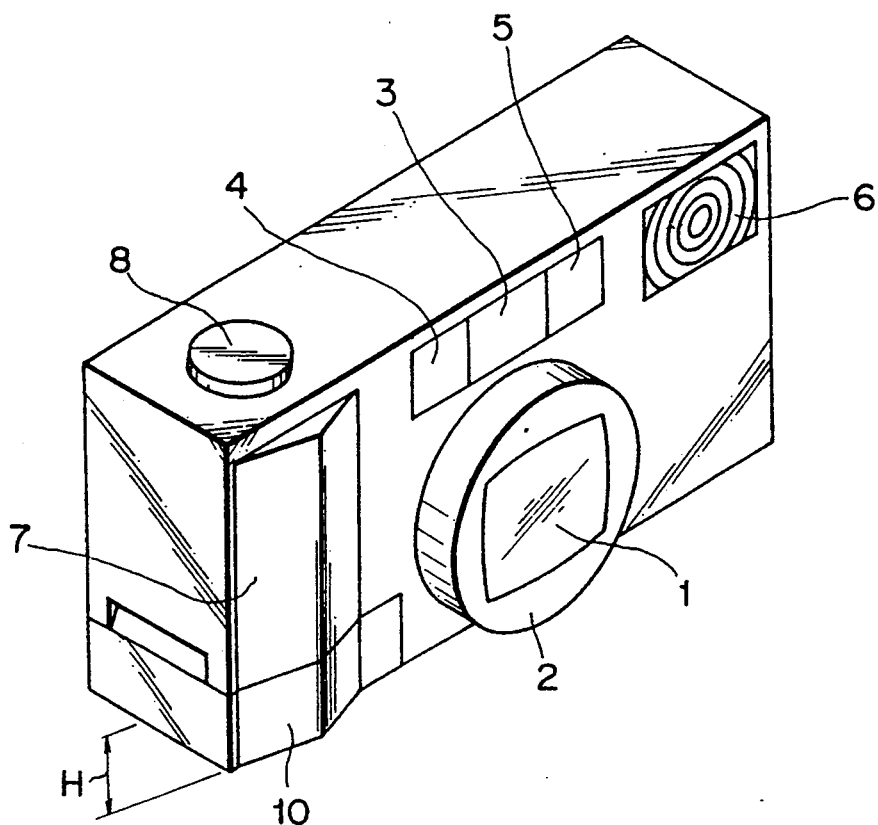
FIG. 1 is a view showing an external appearance of a camera, in which magnetic data is recorded on a film, according to an embodiment of the present invention.
Figure 2:
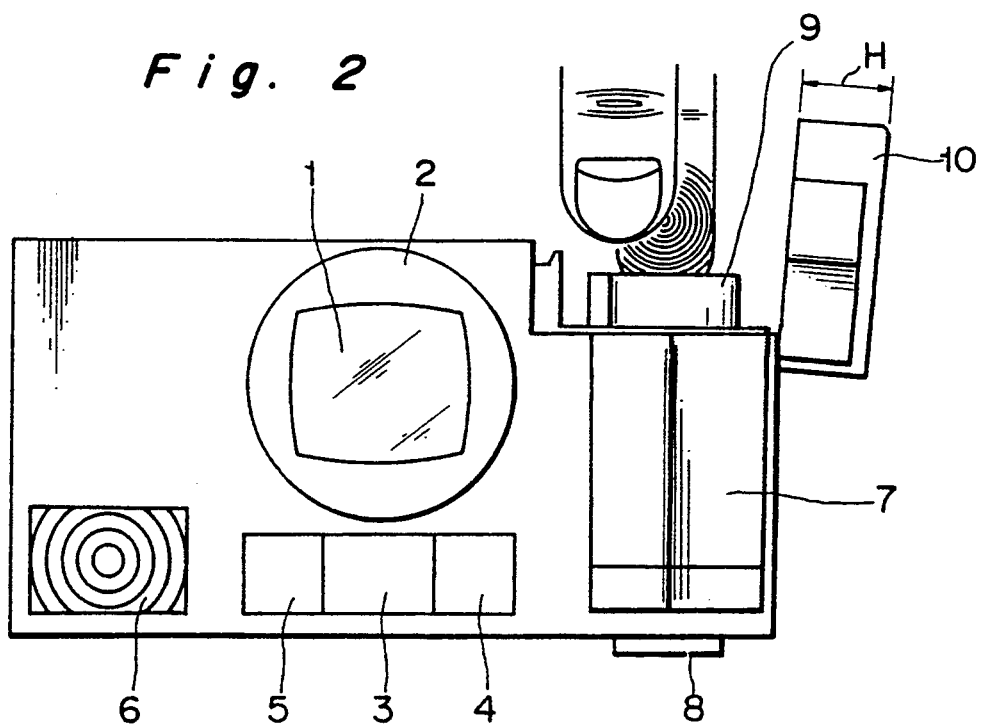
FIG. 2 is a view showing the camera, the cover of which is opened to insert a film cartridge into a cartridge chamber or take it out therefrom.

FIG. 1 shows an external appearance of the magnetic data recording camera according to a first embodiment of the present invention. A lens barrel 2 holding a photographing lens 1 is provided in approximately the center of the front surface of a camera body. A view finder 3 is positioned above the lens barrel 2. A light projecting window 4 and a light receiving window 5 for carrying out a distance measurement are provided on both sides of the view finder 3. A flash light emitting portion 6 contained in the camera body is positioned on the upper left side of the camera body. A gripping projection 7 is formed on the right side of the front surface of the camera body. A release button 8 is positioned on the right side of the upper surface of the camera body. A cover 10 to be opened and closed in inserting a film cartridge 9 into a cartridge chamber and take it out therefrom is provided on the lower right of the camera body. As shown in FIG. 2, the cartridge 9 can be inserted thereinto and taken out therefrom along the axis of the spool 11 (shown in FIG. 3) by opening the cover 10 with the camera body inverted. The height of the cover is (H). When the cover 10 is opened with the cartridge 9 accommodated in the cartridge chamber, the cartridge 9 projects to such an extent that the upper portion thereof can be held between fingers a user's. Therefore, it is unnecessary to provide the camera body with a mechanism for ejecting the cartridge.

Figure 3:
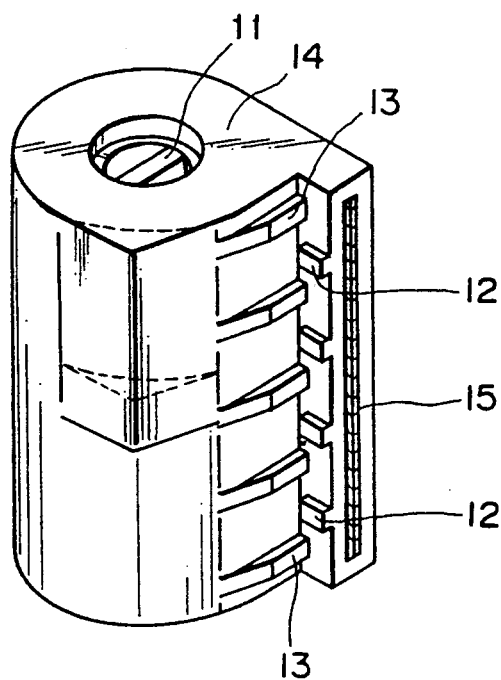
FIG. 3 is a view showing an external appearance of the film cartridge for use in the camera shown in FIG. 1.

FIG. 3 shows an external appearance of the cartridge 9 for use in the camera in accordance with this embodiment. The cartridge 9 is of the thrust type wherein a film (not shown) can be wound around the spool 11 so as to be drawn into the cartridge 9 and fed out therefrom by rotating the spool 11 reversely. Components of the cartridge 9 such as the shell (housing) and spool 11 are made of plastic. Three types of guiding surfaces 12, 13, and 14 are formed in the vicinity of a film passing slit 15 so that the cartridge 9 can be placed in position when it has been inserted into the cartridge chamber. The first set of guiding surfaces 12 are formed on the side face of the throat, or the lip portion which extends tangentially from the shell so that the cartridge 9 is positioned in parallel with the film surface. The second set of guiding surfaces 13 are formed on the side face of the shell of the cartridge 9 so that the second guiding surfaces 13 are perpendicular to the first guiding surfaces 12 at a position adjacent thereto. The second guiding surfaces 13 is formed so that the cartridge 9 are perpendicular to the film surface. The third guiding surface 14 consists of a bottom surface of the cartridge 9 which positions the cartridge 9 so that it is parallel with the axis of the spool 11. A notch for displaying an exposure index is formed on the cornered portion of the shell of the cartridge 9.

Figure 4:
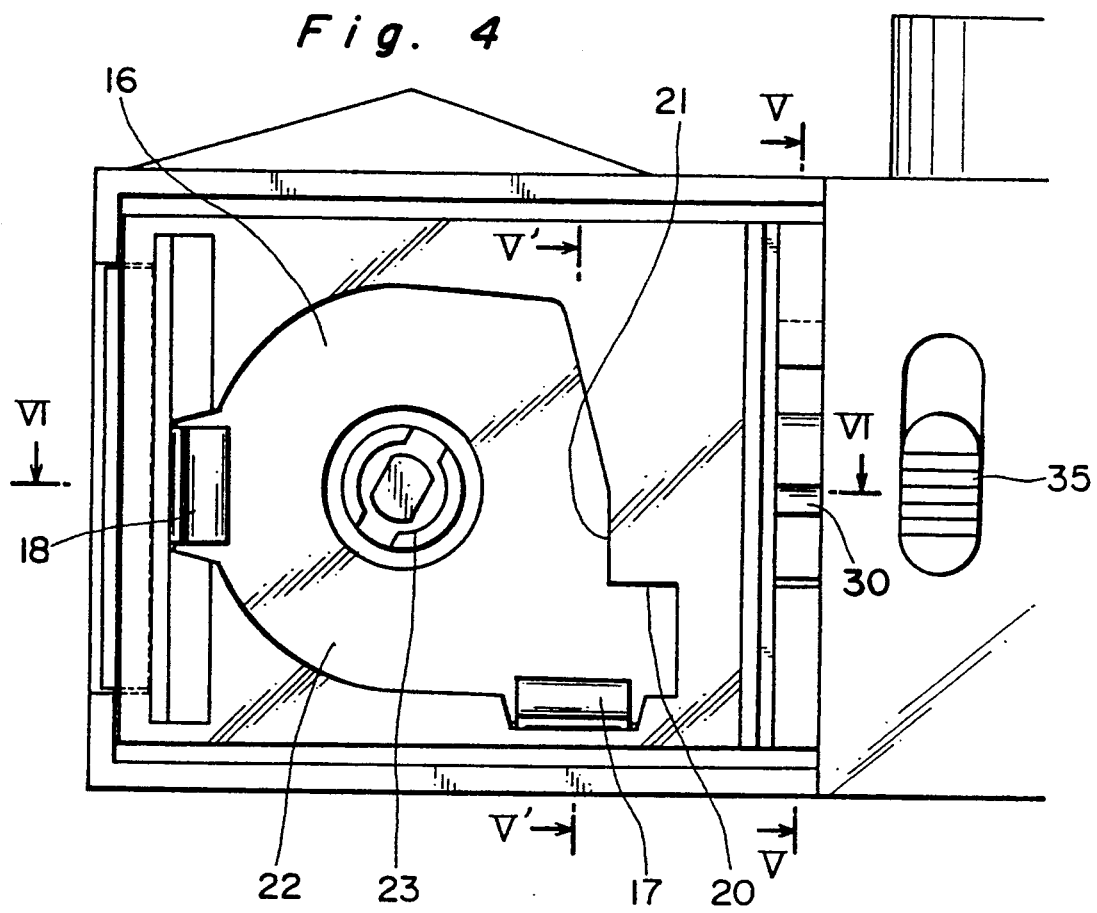
FIG. 4 is a bottom view showing the cartridge chamber of the camera shown in FIG. 1.

The cartridge chamber of the camera is described below with guiding to FIG. 4 through FIG. 6.

The configuration and volume of the cartridge chamber 16 is similar to that of the cartridge 9 as shown in FIG. 3. Leaf springs 17 and 18 are provided in the cartridge chamber 16 such that the leaf spring 17 is at a position through which the line V'—V' Passes and the line leaf spring 18 is at a position through which the VI—VI pass. A first supporting plane 20 which supports the first guiding surfaces 12 of the cartridge 9 is opposed to the spring 17. A second supporting surface 21 which supports the second guiding surfaces 13 of the cartridge 9 is opposed to the spring 18. The resultant of urging force of the springs 17 and 18 which acts on the cartridge 9 brings the first and second guiding surfaces 12 and 13 of the cartridge 9 into contact with the first and second supporting planes 20 and 21, respectively in an approximate equal magnitude. Since the guiding surfaces 12 and 13 are positioned in the vicinity of the lip portion of the cartridge shell, the dislocation of the film passing slit 15 from the predetermined position can be minimized to a permissible degree even though torque to rotate the cartridge 9 is generated. The third guiding surface 14 of the cartridge 9 is supported by the bottom surface of the cartridge chamber 16. As shown in FIG. 6, a leaf spring 19 for pressing the cartridge 9 is mounted on the inner surface of the cover 10.

A fork 23 for rotating the spool 11 of the cartridge 9 in engagement therewith projects from approximately the center of the third supporting plane 22. Referring to FIG. 6 showing the inverted camera body, a coil spring 24 contacts the lower portion of the fork 23 so that the fork 23 is pressed upward in the axial direction thereof, namely, toward the inner space of the cartridge chamber 16. With the expansion and contraction of the coil spring 24, the fork 23 is moved vertically. Even though the cartridge spool 11 does not appropriately engage the fork 23 when the cartridge 9 is inserted into the cartridge chamber 16, the fork 23 is capable of moving downward as shown by the broken line in FIG. 6. Therefore, the cover 10 can be closed. Even though the cartridge spool 11 does not engage the fork 23 appropriately when the cartridge 9 is inserted into the cartridge chamber 16, the position of the fork 23 with respect to the cartridge spool 11 becomes appropriate while the fork 23 is rotated by a driving gear 25. Then, the coil spring 24 returns the fork 23 to the normal position. Thus, the cartridge spool 11 engages the fork 23 appropriately. The driving gear 25 is connected with a gear system (not shown) for rotating the driving gear 25 both ways (clockwise and counterclockwise). A contact strip 26 for detecting the rotational position of the gear 25 is fixed to the bottom surface of the gear 25. A rotational position detecting switch substrate 27 is fixed in opposition to the contact strip 26. The contact strip 26 and the switch substrate 27 monitor the rotational position of the fork 23.

The cover 10 is pivotally supported by a side wall 28 of the camera body. The cartridge chamber 16 is opened and closed by the pivotal motion of the cover 10. Rubber extending from the gripping projection 7 is mounted on the front portion of the cover 10 so that the cover 10 does not slip through a photographer's fingers. The cover 10 comprises an inner hook 29 formed on the free end thereof. As shown in FIG. 5, a locking claw 30 releasably engaging the hook 29 is formed on the camera body. The claw 30 moves in the thickness direction of the camera body. The cover 10 remains closed by both the hook 29 and the claw 30 which cooperate with each other. The lock spring 31 urges the claw 30 toward the hook 29 so that the claw 30 engages the hook 29 when the cover 10 is closed. The claw 30 comprises an elastic locking arm 32. When the cover 10 is opened as result of the disengagement of the claw 30 from the hook 29, the arm 32 engages a portion 33 of the camera body and the lock spring 31 prevents the claw 30 from returning to the position in which the claw 30 engages the hook 29. When the cover 10 is closed, the arm 32 is pressed downward by an unlocking rib 34 formed on the cover 10, so that the arm 32 is disengaged from the portion 33 and the lock spring 31 allows the claw 30 to return to the position in which the claw 30 engages the hook 29. The claw 30 is integrally formed with a button 35 (shown in FIG. 4) mounted on the bottom surface of the camera body. The claw 30 and the hook are disengaged from each other when the button 35 is operated by the photographer. The movement of the claw 30 in the unlocking direction is restrained by a gravity operated lever 36 when the camera body is held for a normal (horizontal) format. The gravity operation lever 36 is curved like a boomerang as shown in FIG. 6. A weight 37 is mounted on one end of the gravity operated lever 36 so that one end drops by gravity in preference to the other end thereof. When the camera body is not inverted, downward movement of one end of the gravity operated lever 36 results in the other end moving upward, thus contacting one end of the claw 30. As a result, the gravity operated lever 36 prevents the claw 30 from moving in the direction in which the claw 30 disengages the hook 29. When the camera body is inverted, with the drop of the end on which the weight 37 is mounted, the other end disengages from the claw 30. Thus, the gravity operated lever 36 allows the claw 30 to move in the direction in which the claw 30 disengages from the hook 29. That is, when the camera body is not inverted, the button 35 is inoperable because it is locked by the lever 36. Unless the camera body is inverted, the button 35 does not allow the cover 10 to be opened. When the cover 10 is opened to take out the cartridge 9 from the cartridge chamber 16 with the camera body inverted, the cartridge 9 does not drop. Reference numerals 38 and 39 in FIG. 6 denote stoppers of the gravity operated lever 36

Figure 5:
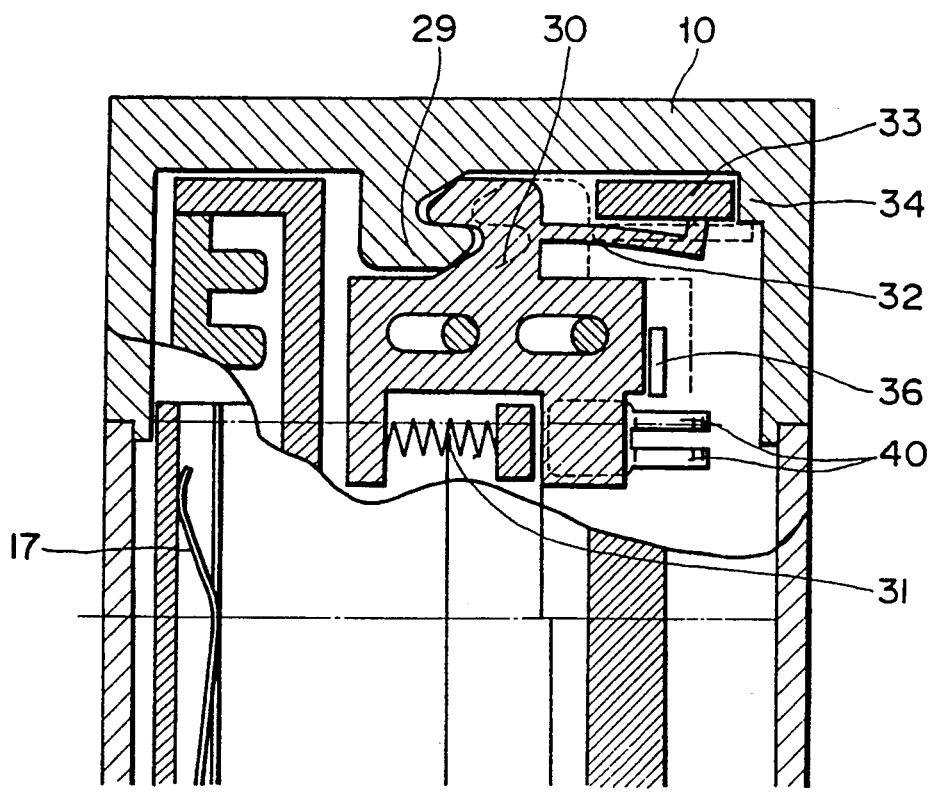
FIG. 5 is a sectional view taken along the lines V—V and V'—V' shown in FIG. 4.
Figure 6:
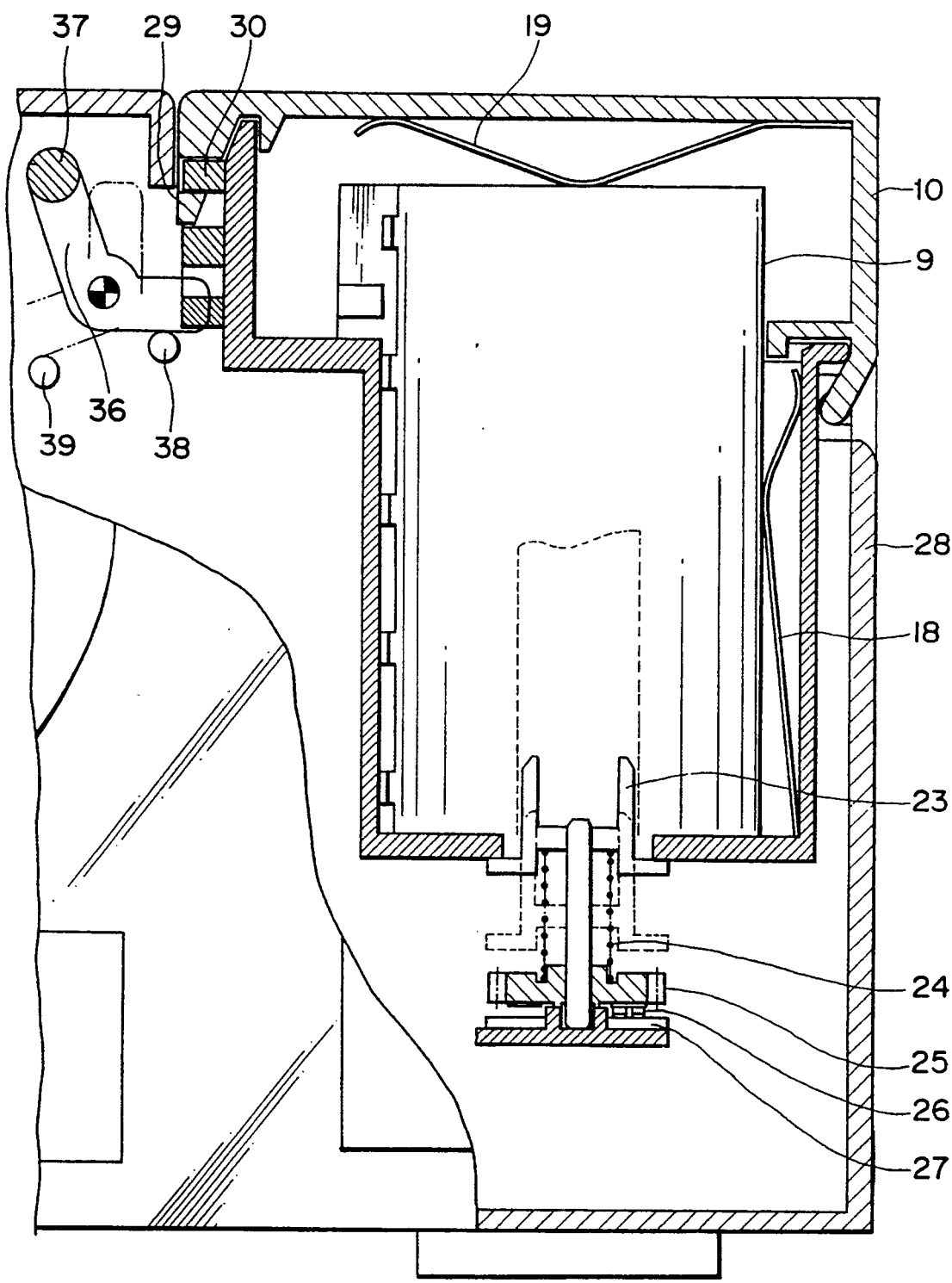
FIG. 6 is a sectional view taken along the line VI—VI shown in FIG. 4.

A contact strip 40 shown in FIG. 5 detects whether or not the cover 10 has been closed, i.e., monitors whether the claw 30 is in the cover-closed position or in the cover-opened position in cooperation with a substrate (not shown.)

Figure 24:
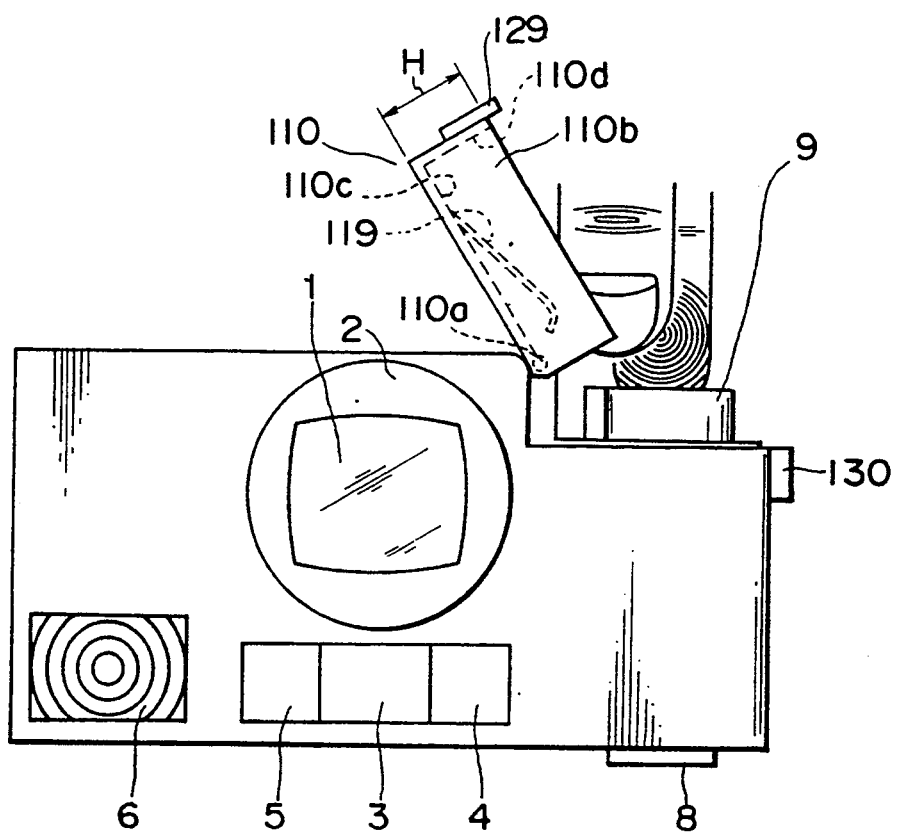
FIG. 24 is a view showing the camera, the cover of which is opened to insert a film cartridge into a cartridge chamber or take it out therefrom.

FIG. 24 shows a modification of the cover. A cover 110, pivotally supported by a shaft 110a, comprises a front wall 110b, a bottom wall 110c, a side wall 110d, and a rear wall not shown. There is provided on the inner surface of the bottom wall 110c, a leaf spring 119 for elastically pressing the cartridge 9 along the axis of the cartridge spool. There is provided on the side wall 110d a locking portion 129 releasably locked by a locking mechanism 130 provided on the side wall of the camera body. The height of the side wall 110d is equal to that of the side wall shown in FIG. 2, so that the cartridge 9 projects to such an extent that the upper portion thereof can be held between a user's fingers.

Figure 7:
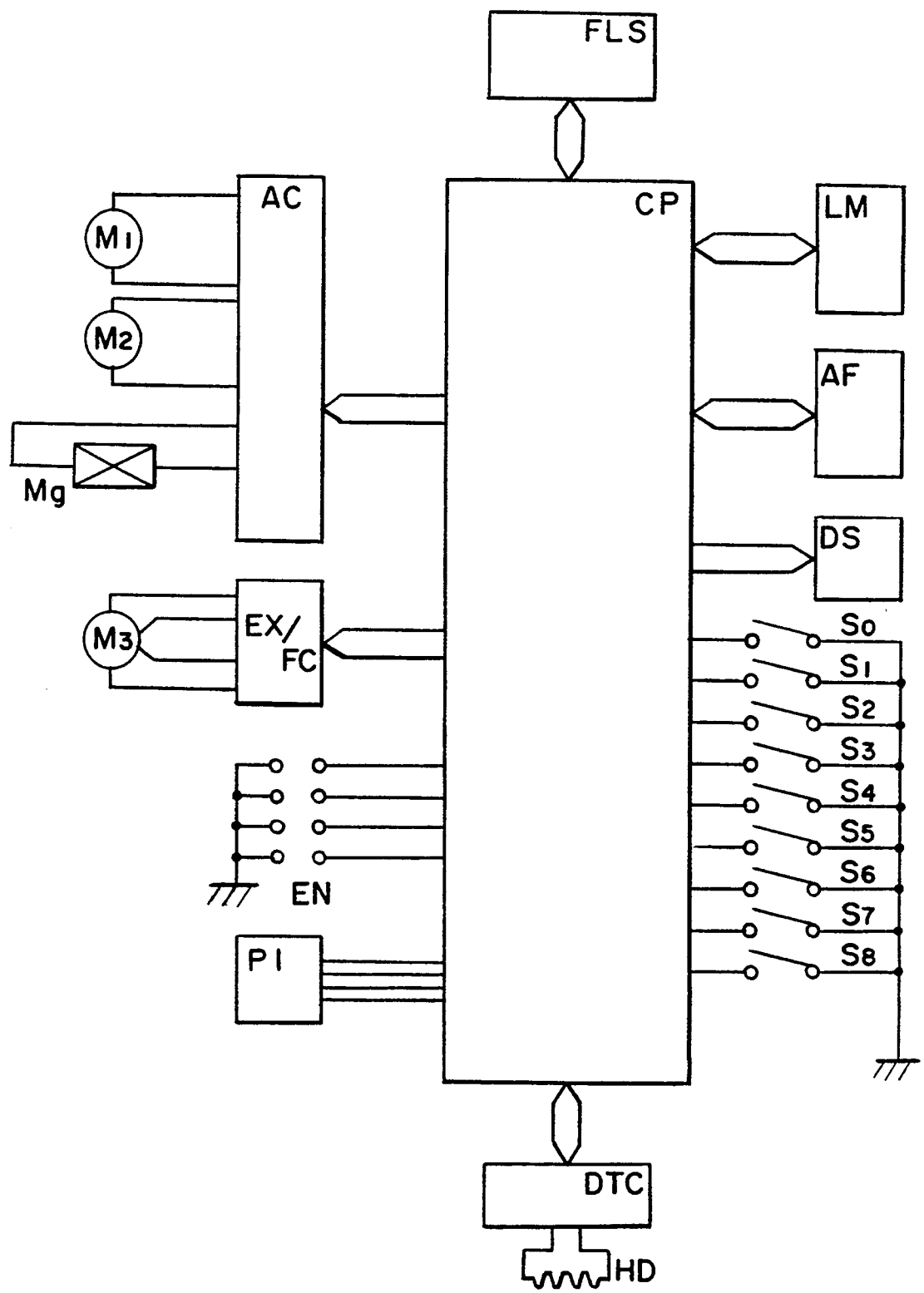
FIG. 7 is a circuit block diagram of the camera according to the embodiment.

The electrical circuit of the camera according to the embodiment is described below with guiding to FIG. 7.

The electrical circuit comprises a microcomputer CP, a flash control section FLS for controlling the flash operation of the flash 6 contained in the camera body via the microcomputer CP. A photometric section LM and a distance measuring section AF perform a photometric operation and a distance measuring operation, respectively, according to an instruction issued from the microcomputer CP and feed back photometric data and object distance data to the microcomputer CP. A display control section DS controls the data display to be made in a display window (not shown) of the camera body. A data control section DTC connected with a magnetic head HD processes photographing data of the film. An actuator driving section AC controls a first motor $M_1$ for pre-winding the film, winding (feeding) of the film into the film cartridge 9, and driving the magnetic head HD; a second motor $M_2$ for driving the zooming mechanism of the view finder; and an electromagnet Mg for keeping the pad of the magnetic head HD charged. An exposure/focus control section EX/FC controls a third motor $M_3$ for moving the photographing lens for a focusing operation and performing a shutter release operation. A zoom encoder EN detects the position of the optical system of the zooming mechanism of the view finder. A photointerrupter PI detects the perforation of the film.

According to ON and OFF of switches $S_O$ through $S_8$, the operation of the camera is determined. When the main switch $S_O$ turns on, the main power produced by the main power source (not shown) is supplied to the camera. When the photometric switch $S_1$ is ON, a photometric operation is performed. When the release switch $S_2$ is ON, a shutter release is started. Upon depression of the release button 8 at the first stroke thereof, the photometric switch $S_1$ is turned on. Upon depression of the release button 8 at the second stroke thereof, the release switch $S_2$ is turned on. The zoom-out switch $S_3$ alters the pseudo focal length from the long focal length side (hereinafter referred to as the tele side) to the short focal length side (hereinafter referred to as the wide side). The zoom-in switch $S_4$ alters the pseudo focal length from the wide side to the tele side. The switches $S_3$ and $S_4$ also drive the zooming mechanism of the view finder. The cover switch $S_5$ is turned on when the cover 10 of the cartridge chamber 16 is closed, with the result that the level of a signal outputted from the terminal of the microcomputer CP is switched from high to low. The charge cam position detecting switch $S_6$, for detecting whether or not a charge cam functioning as an actuator for bringing the magnetic head HD into contact with the film, is at the initial position. When the charge cam is at the initial position, the switch $S_6$ is on-state. The flash switch $S_7$ controls ON and OFF of the flash 6 according to ON and OFF. The battery detecting switch $S_8$ is turned on when a battery is loaded in the battery cheer (not shown) and turned off when the battery is not loaded in the battery chamber.

Description is made below on the construction and operation of the film feeding mechanism for carrying out the initial loading of the film, pre-winding thereof, and winding of the film frame by frame into the film cartridge and the mechanism for driving the magnetic head and the pad.

Figure 8:
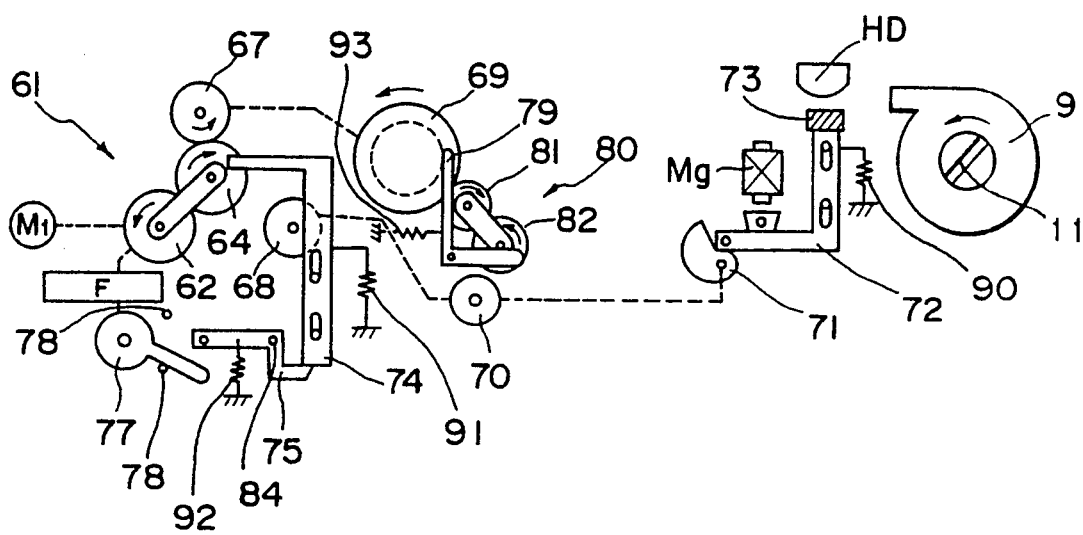
FIG. 8 through FIG. 15 are explanatory views showing an operation in the condition of each of the film feeding mechanism and the pad driving mechanism of the magnetic head portion of the camera according to the embodiment.
Figure 9:
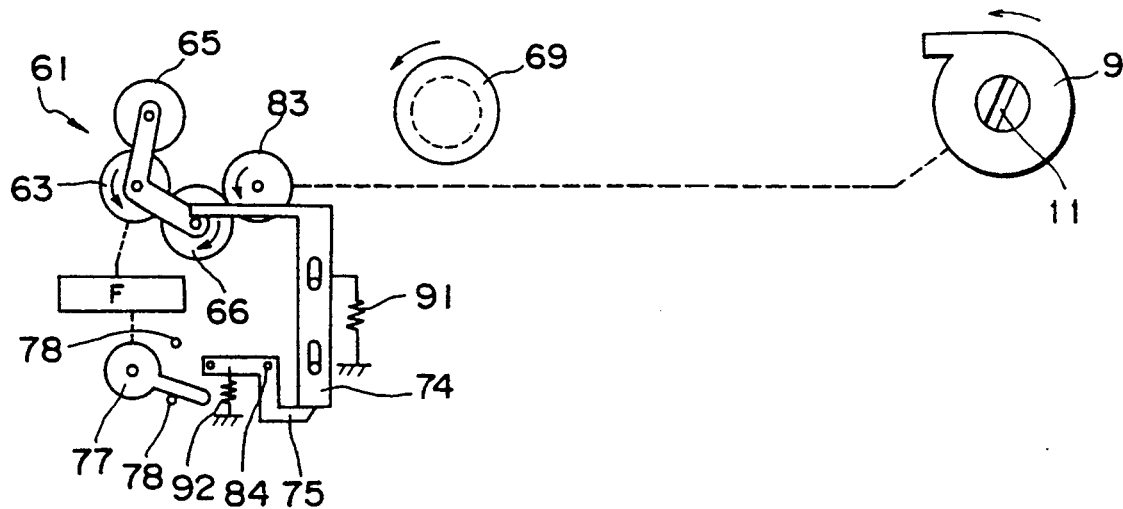

FIGS. 8 and 9 show the construction of the principal portion of the film feeding mechanism of the camera and the pad driving mechanism of the magnetic head in the initial loading condition of the film. The construction of FIGS. 8 and that of FIG. 9 are each at a different height. The film feeding mechanism and the pad driving mechanism of the magnetic head have the first motor $M_1$ in common. A first planetary gear mechanism 61 is employed to connect the first motor $M_1$ to the film feeding mechanism or the pad driving mechanism. The first planetary gear mechanism 61 comprises a first sun gear 62 and a second sun gear 63 which are coaxial and simultaneously rotate. The first sun gear 62 engages a first planetary gear 64. The second sun gear 63 engages a second planetary gear 65 and a third planetary gear 66. The first planetary gear 64 revolves in a clockwise and counterclockwise direction round the first sun gear 62 according to the rotation of the first sun gear 62. According to the revolving direction of the first planetary gear 64, the driving force of the first motor $M_1$ is transmitted to a pre-winding gear 67 for transmitting the driving force of the first motor $M_1$ to the spool 69 contained in the camera body or to the first charge gear 68 which will be described later. The second and third planetary gears 65 and 66 can engage selectively a fork gear 83 or move away from it. The fork gear 83 transmits the driving force of the first motor $M_1$ to the cartridge spool 11 via the fork 23 shown in FIG. 6. With the engagement between the third planetary gear 66 and the fork gear 83 due to the counterclockwise rotation of the second sun gear 63, the force for feeding out the film from the cartridge 9 is transmitted to the cartridge spool 11. With the engagement between the second planetary gear 65 and the fork gear 83 due to the clockwise rotation of the second sun gear 63, the force for winding the film into the cartridge 9 is transmitted to the cartridge spool 11.

The pre-winding gear 67 transmits the driving force of the motor $M_1$ to the camera spool 69 so that a pre-winding operation is carried out. The first charge gear 68 transmits the driving force of the first motor $M_1$ to a charge cam 71 via a second charge gear 70. The charge cam 71 controls the movement of a pad lever 72 owing to its cam profile. A pad 73 is mounted on one end of the pad lever 72. The pad 73 releasably brings the film into contact with the magnetic head HD according to the movement of the pad lever 72. A spring 90 forces the pad lever 72 to keep contacting the charge cam 71. The magnet Mg is energized and attracts the pad lever 72 for the pad 73 to keep the film in contact with the magnetic head HD. The charge cam 71 rotates counterclockwise and the condition as shown in FIG. 8 is the initial position thereof. The initial position of the charge cam 71 is the position in which the pad lever 72 has been moved back toward the charge cam 71 by the spring 90 after the charge cam 71 presses the pad lever 72 uppermost so that the pad 73 brings the film into contact with the magnetic head HD. That is, the pad 73 is spaced a predetermined distance from the magnetic head HD when the charge cam 71 is in the initial position, so that the film is in contact with neither the magnetic head HD nor the pad 73.

A control lever 74 contacts the shaft of the first and third planetary gears 64 and 66 depending on its position, thus controlling the position of the planetary gears 64 and 66. The control lever 74 has two arms at a different height in conformity with the different height of the arm of the first and third planetary gears 64 and 66. The control lever 74 is urged downward by a spring 91. According to the engagement and disengagement between the lock lever 75 and the control lever 74, the control lever 74 takes two different positions. A spring 92 causes the lock lever 75 to be rotatable counterclockwise about its shaft 84. The driving force of the first motor $M_1$ is transmitted from the sun gear or the shaft thereof to an unlocking lever 77 via a friction mechanism (F). With the counterclockwise rotation of the unlocking lever 77 in engagement with one end of the lock lever 75, the unlocking lever 77 rotates the lock lever 75 clockwise against the urging force of the spring 92, thereby moving the lock lever 75 upward. As a result, the lock lever 75 disengages from the control lever 74. The pivotal range of the unlocking lever 77 is restricted by a pair of stoppers 78, 78. That is, even though the driving force of the first motor $M_1$ is transmitted to the unlocking lever 77 via the sun gear when the unlocking lever 77 is in contact with the stopper 78, the friction mechanism (F) prevents the unlocking lever 77 from pivoting beyond the stopper 78. Therefore, the position of the unlocking lever 77 is maintained.

A second planetary gear mechanism 80 is connected with the camera spool 69. The second planetary gear mechanism 80 comprises a sun gear 81 (hereinafter referred to as a third sun gear) and a planetary gear 82 (hereinafter referred to as a fourth planetary gear) which engages the third sun gear 81. The third sun gear 81 is rotated by the spool 69. The fourth planetary gear 82 revolves clockwise and counterclockwise round the third sun gear 81, thus engaging the second charge gear 70 and disengaging therefrom.

A groove is formed on the camera spool 69 so that one end of a detecting lever 79 is fitted into the groove. When the film is wound around the camera spool 69 in the initial loading, the detecting lever 79 is pressed out from the groove by the film wound around the spool, 69. The detecting lever 79 contacts the shaft of a fourth planetary gear 82, thus regulating the revolving range of the fourth planetary gear 82 so as to engage the fourth planetary gear 82 with the second charge gear 70 and disengage therefrom.

Figure 16:
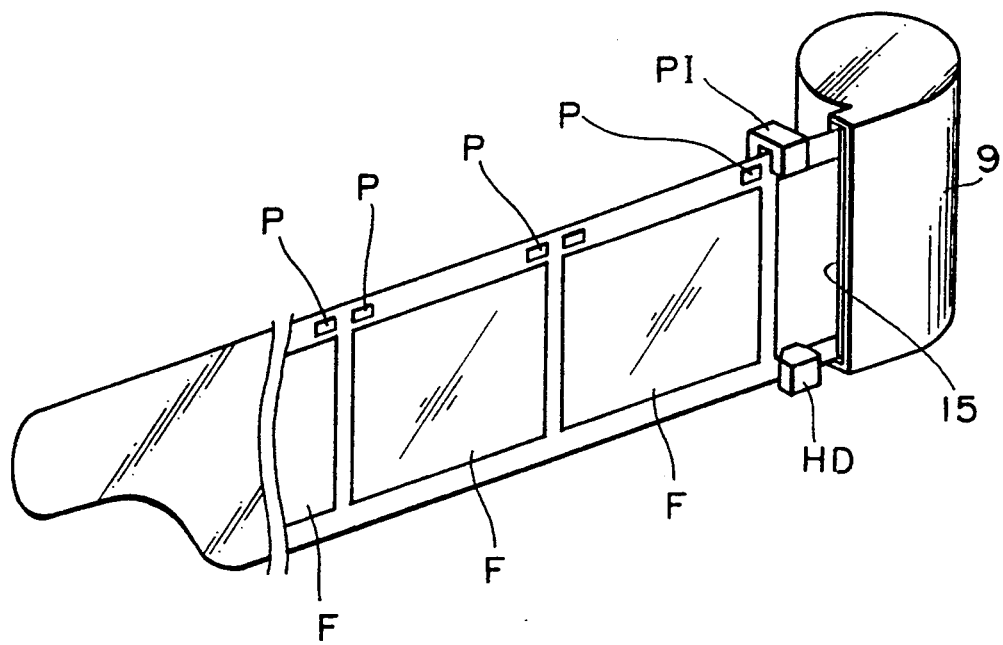
FIG. 16 shows the relationship between the film and both the photointerrupter and magnetic head.

FIG. 16 shows the position relationship between the film and the magnetic head as well as the photointerrupter for detecting the position of the film when the initial loading and pre-winding of the film are carried out and when the film is wound frame by frame into the film cartridge 9. Two perforations (P) are formed on both ends of each frame (F) so that the photointerrupter PI can recognize them. Although not shown, three perforations are adjacently formed on the rear end portion of the rearmost frame, namely, the frame which is rearmost when the film is wound up by the camera spool 69. The photointerrupter PI provided adjacent to the film passing slit 15 of the cartridge 9 such that the position of the photointerrupter aligns with the perforation (P). The magnetic head HD provided in the vicinity of the back surface of the film such that the magnetic head HD aligns with the lower end portion of the film. The film has a magnetic layer formed on the back surface thereof. The photointerrupter PI outputs a low level signal when the perforation (P) passes therethrough or when the leading end of the film is on the side of the cartridge 9 with respect to the photointerrupter PI and a high level signal when light emitted by the light projecting portion is intercepted by the film.

Referring to the flowcharts shown in FIG. 17 through FIG. 23, the operation of the camera according to the embodiment is described below.

Figure 17A:
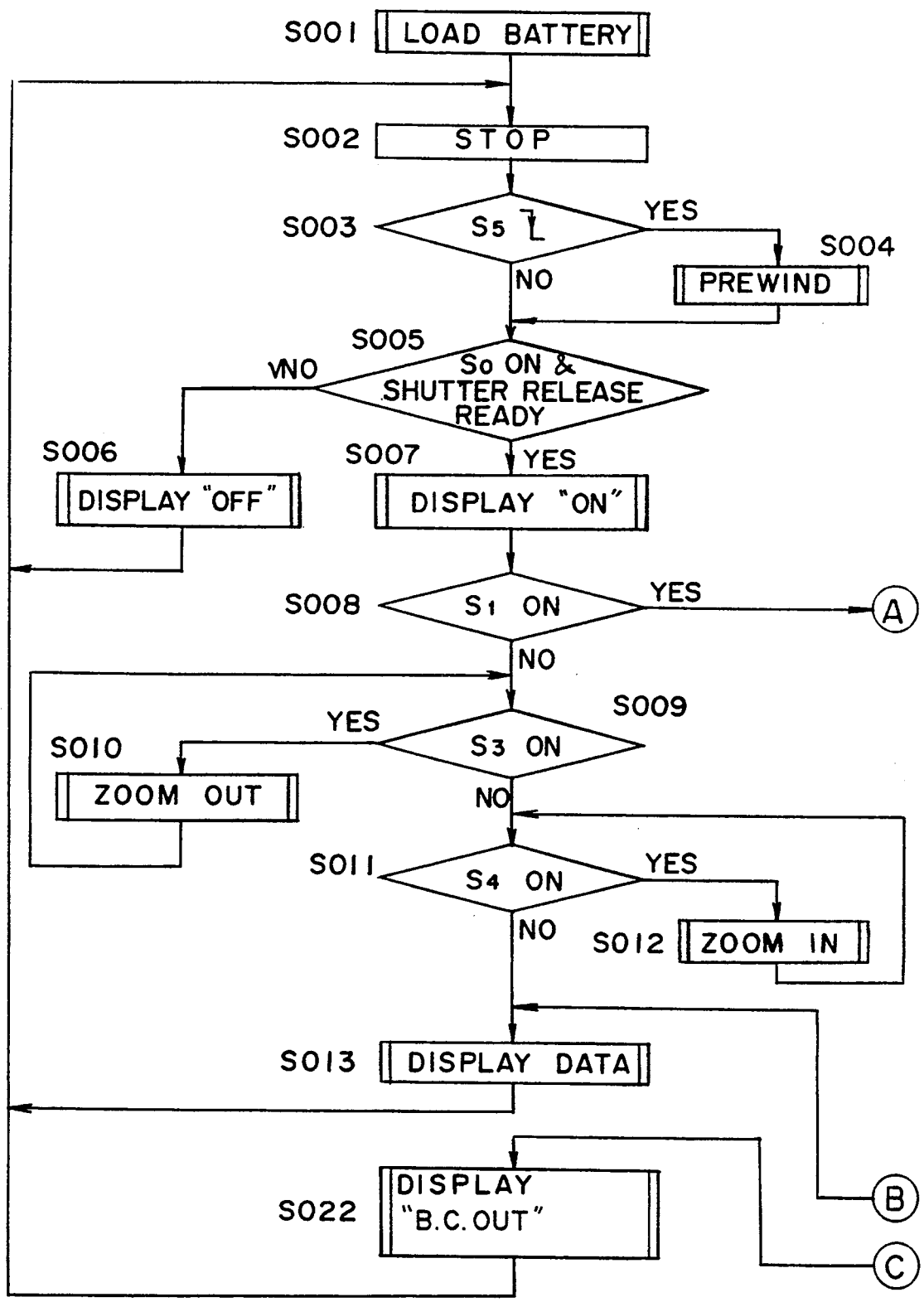
FIGS. 17(a) and 17(b) are flowcharts showing the main routine of the operation of the camera according to the embodiment.

FIG. 17 shows the main routine of the operation of the camera. First, at step S001, the battery serving as the power source of the camera is loaded. Upon loading of the battery, the battery detecting switch $S_8$ is turned on and simultaneously, the operation for initializing the camera condition is executed according to the subroutine shown in FIG. 23. Then, the program goes to step S002 at which the operation of the camera stops, and the microcomputer CP waits until data is input. If any operation is executed in this condition, it is decided at step S003 whether or not the level of the signal of the cover switch $S_5$ has changed from high to low. That is, if the cartridge 9 is loaded into the cartridge chamber 16, the pre-winding of the film is carried out. Therefore, it is decided at step S002 whether pre-winding is necessary. If it is decided at step S003 that the signal of the cover switch $S_5$ has changed from high level to low level, the program goes to step S004 at which the pre-winding of the film is performed according to the subroutine shown in FIG. 18 through FIG. 20. After the pre-winding terminates or if the level of the signal of the cover switch $S_5$ has not changed from high to low, i.e., if the pre-winding is unnecessary, it is decided an step S005 whether or not the main switch $S_0$ is ON and a shutter release is possible. Whether or not the shutter release is possible is decided according to whether or not a shutter release prohibition flag is set in the memory (not shown) of the microcomputer CP. If the main switch $S_0$ is OFF or the shutter release prohibition flag is set in the memory, the display of OFF of the main power source is made at step S006. Then, the program returns to step S002 at which the microcomputer CP waits until data is input.

If it is decided at step S005 that the main switch is ON and the shutter release can be carried out, the display of ON of the main power source is made at step S007 and it is decided at step S008 whether or not the photometric switch $S_1$ is ON. If the photometric switch $S_1$ is ON, it is decided that the release button 8 has been pressed at the first stroke thereof, that is, a photographing composition is decided and the shutter release is about to be carried out. If a photographing composition has yet to be decided, the photometric switch $S_1$ is still OFF and a zooming operation is performed at step S009 and steps subsequent thereto. In this case, it is decided at step S009 whether or not the zoom-out switch $S_3$ is ON. If yes, the zoom-out of the view finder is performed at step S010 according to the zoom-out subroutine. If it is decided at step S009 that the zoom-out switch $S_3$ is OFF, it is decided at step S011 whether or not the zoom-in switch $S_4$ is ON. If the zoom-in switch $S_4$ is ON, the zoom-in of the view finder is performed at step S012 according to the zoom-in subroutine. If the switches $S_3$ and $S_4$ are both OFF, a data display is made at step S013. Then, the program returns to step S002 at which a data input is waited.

Figure 17B:
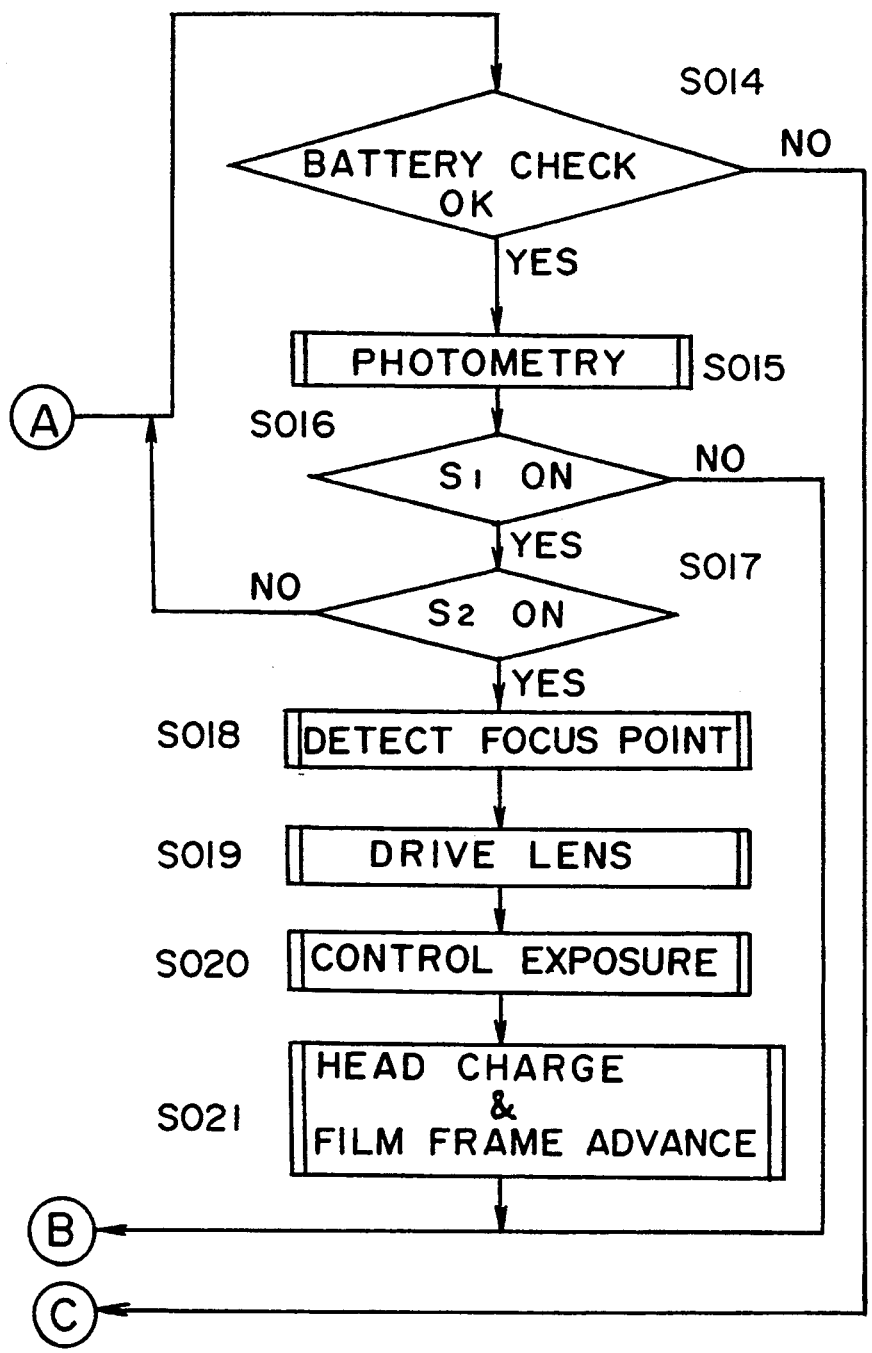

If it is decided at step S008 that the photometric switch $S_1$ is ON, i.e., if a photographing composition has been determined and the shutter release is about to be performed, a battery check is executed at step S014 shown in FIG. 17(b) so as to decide whether or not the voltage of the battery is sufficient for subsequent operations. If the voltage is sufficient, a photometric operation is executed at step S015 according to the subroutine. It is decided at step S016 whether or not the photometric switch $S_1$ is still ON after the photometric operation is performed. That is, it is decided at step S016 whether or not the release button 8 remains depressed at the first stroke thereof. If the photometric switch $S_1$ is switched to OFF, the program returns to step S002 through step S013 because the photographing operation has been stopped. At step S002, the microcomputer CP waits until data is inputted thereto. If it is decided at step S016 that the photometric switch $S_1$ remains ON, it is decided at step S017 whether or not the release switch $S_2$ is ON. If the release button 8 has been depressed at the second stroke thereof, the release switch $S_2$ is turned on. Then, a shutter release operation carried out based on an automatic focusing control (steps S018 and S019) and an automatic exposure control (step S020). At step S021, film winding around the cartridge spool 11 by one frame and recording of magnetic data of photographing information are carried out according the subroutines shown in FIGS. 21 and 22. Then, the program returns to step S002 through step S013. If it is decided at step S017 that the release switch $S_2$ is OFF, it is decided that the photographer has not depressed the release button 8 at the second stroke thereof. Then, the program returns to step S014 so as to continue a photometric operation until the release switch $S_2$ is turned on.

If it is decided at step S014 that the voltage of the battery has dropped when the release button 8 is about to be depressed at the second stroke thereof, a data display of "B.C.OUT" is made at step S022. Then, the program returns to step S002 at which the microcomputer CP waits until data is input. In this case, it is necessary to replace the old battery with a new battery.

Referring to FIG. 8 through FIG. 16 and FIG. 18 through FIG. 20, the detail of the pre-winding operation to be performed at step S004 of the main routine is described below.

Figure 18A:
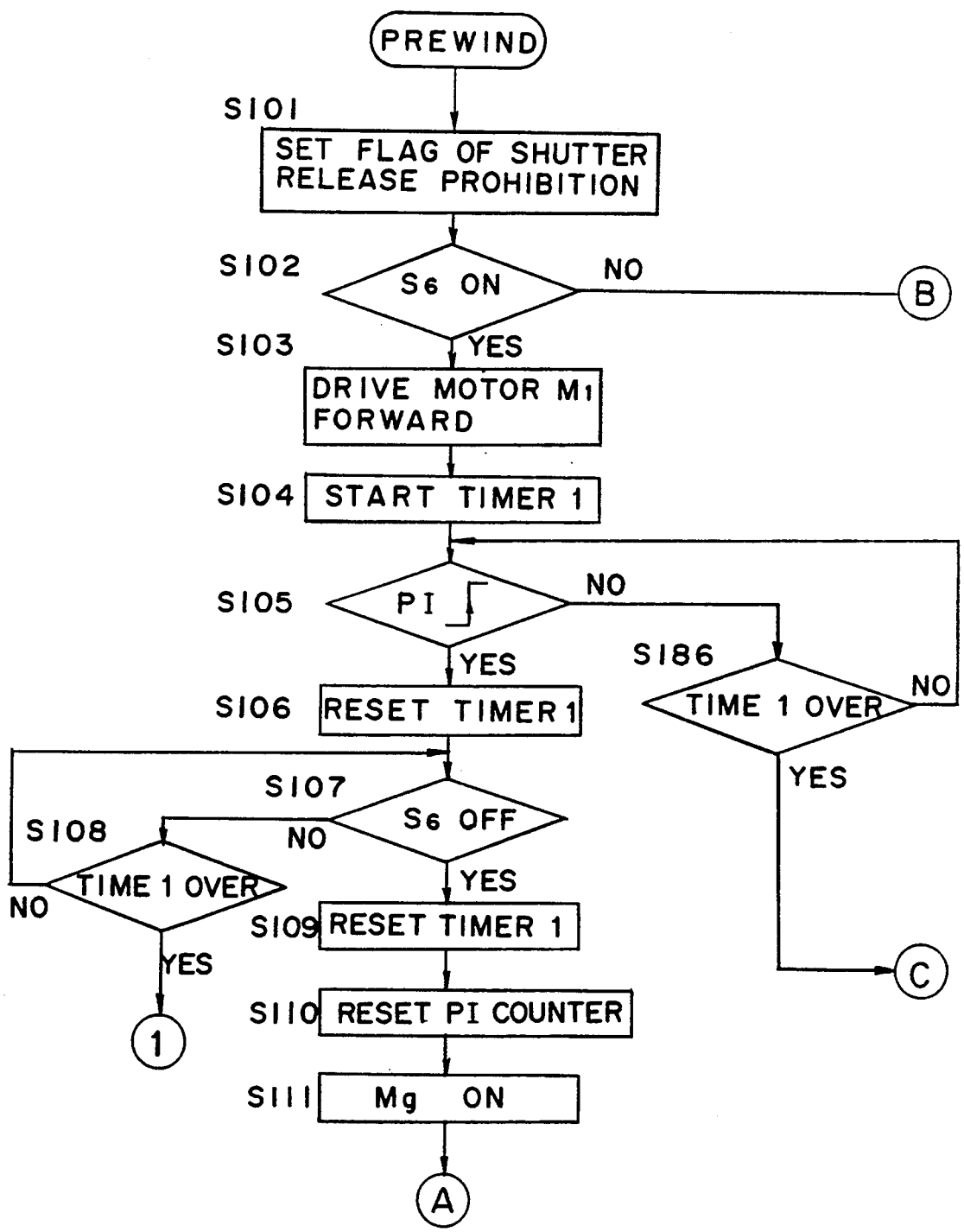
Figure 18B:
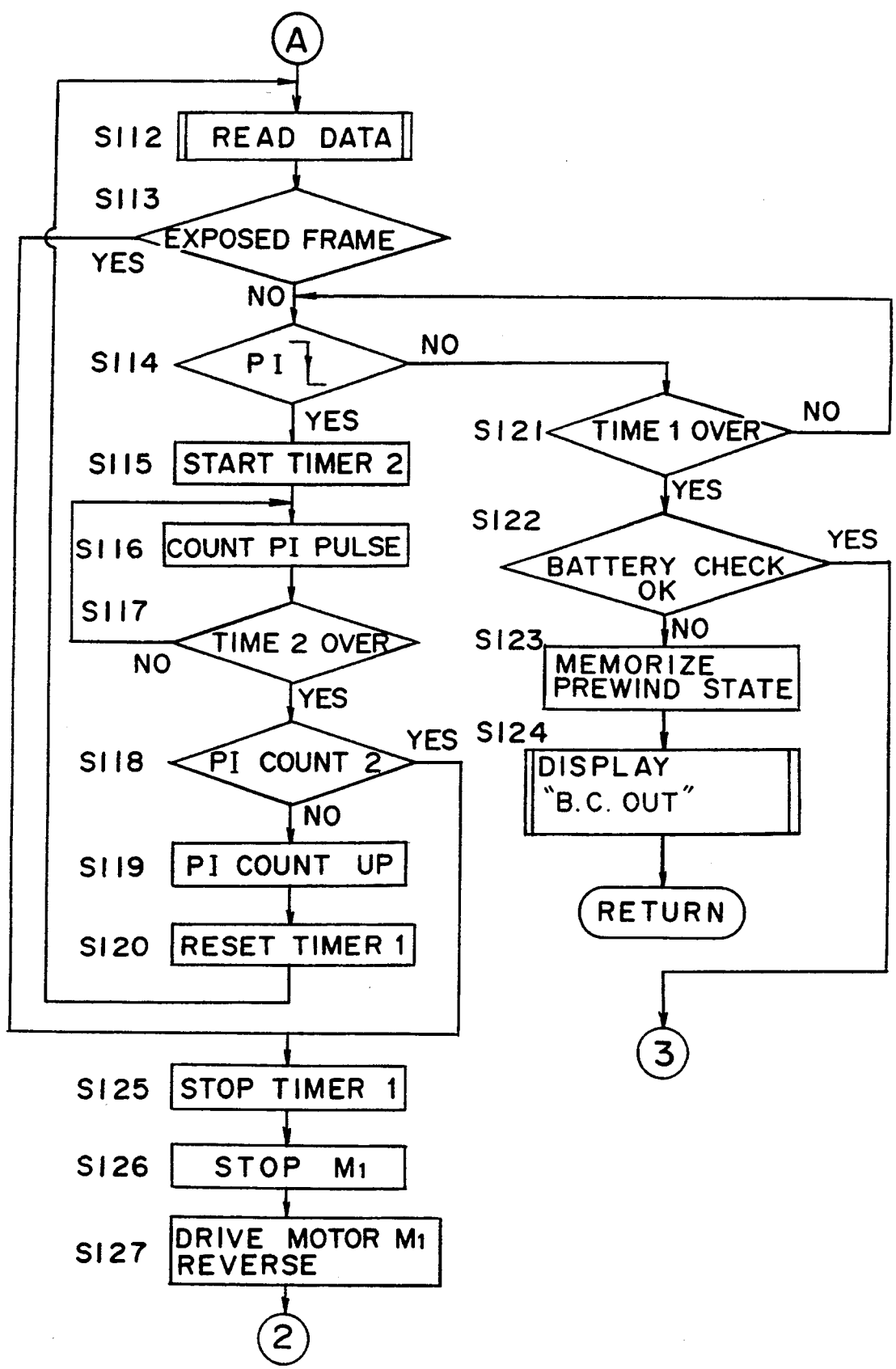
Figure 18C:
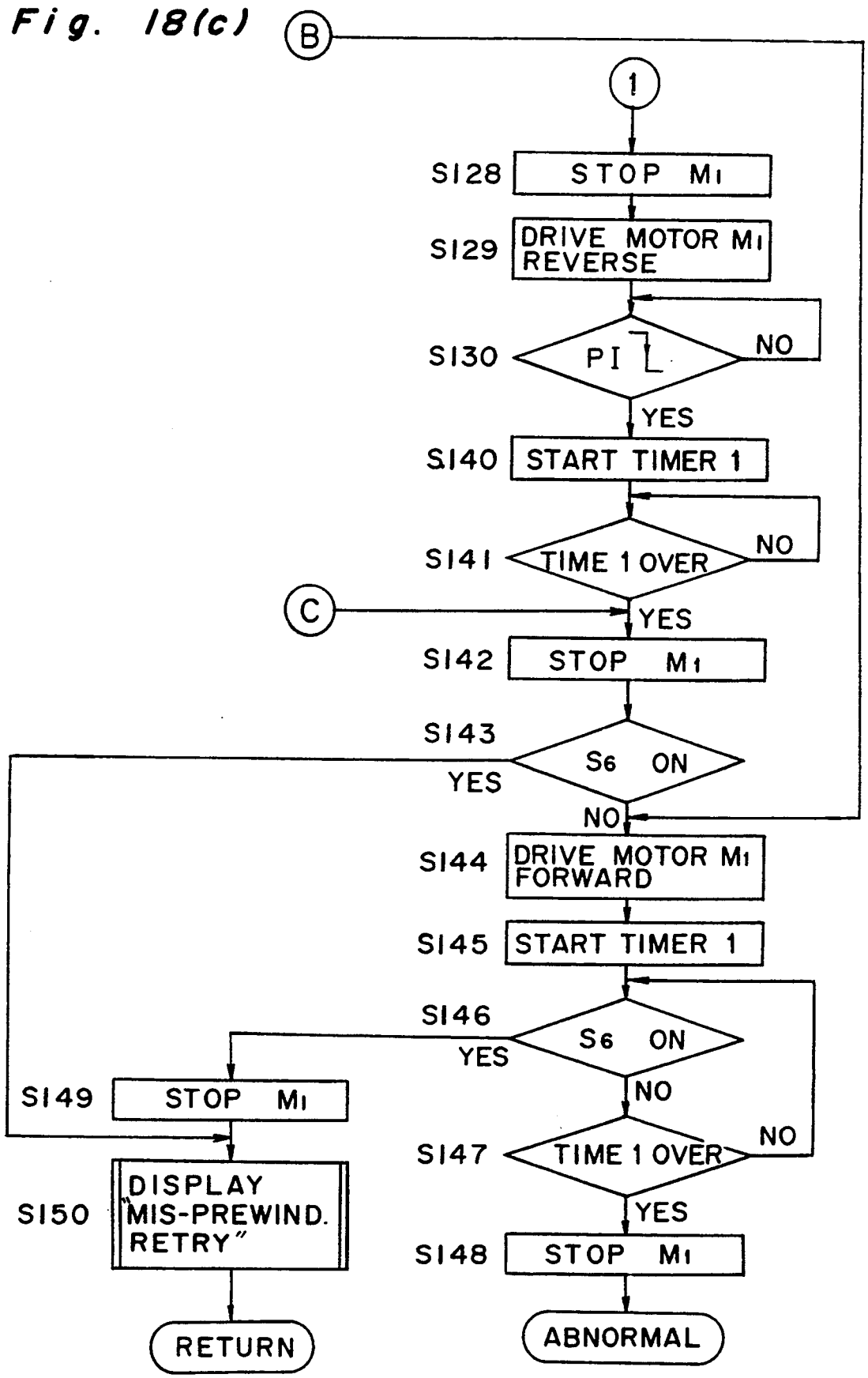
Figure 19:
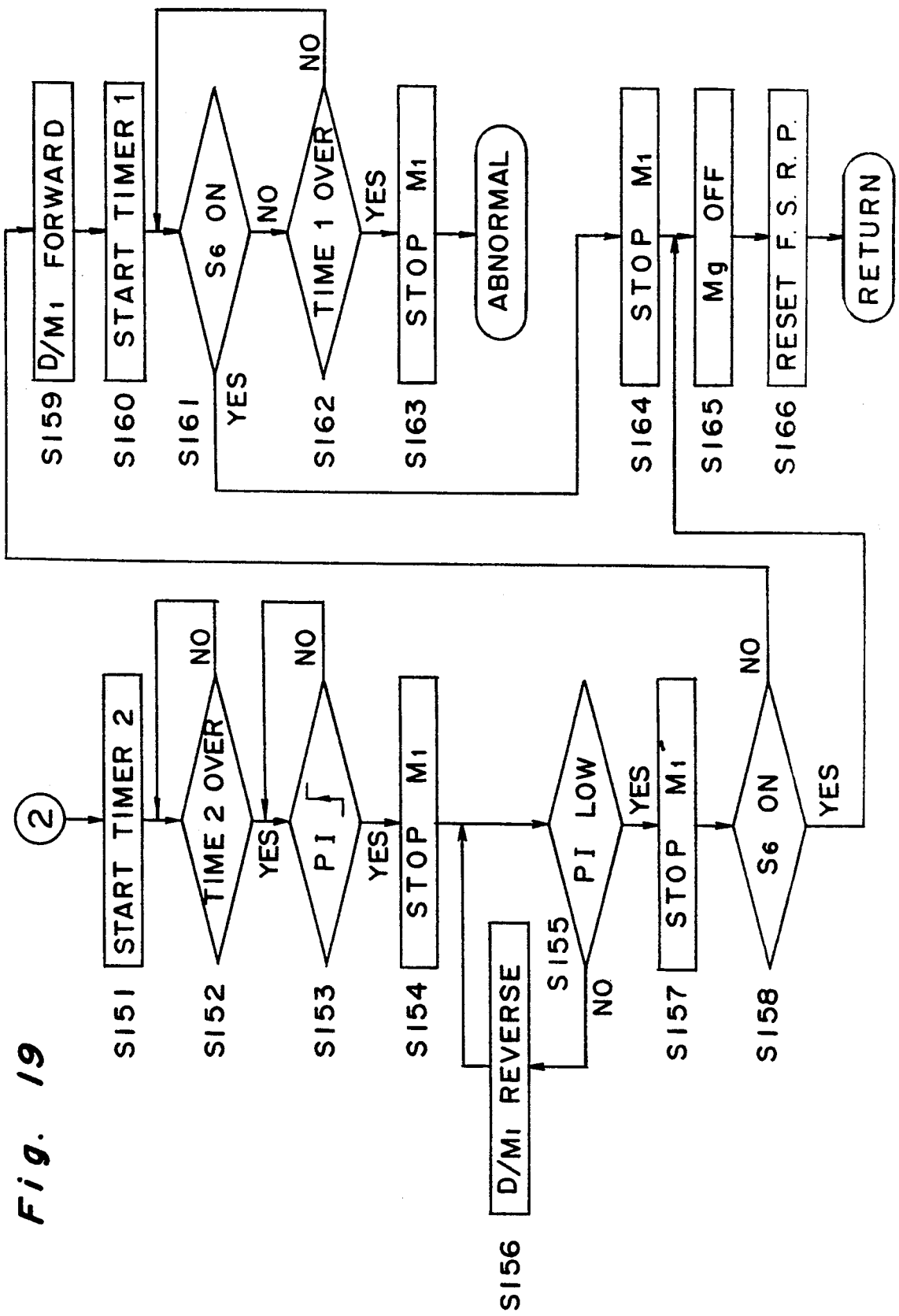
Figure 20:
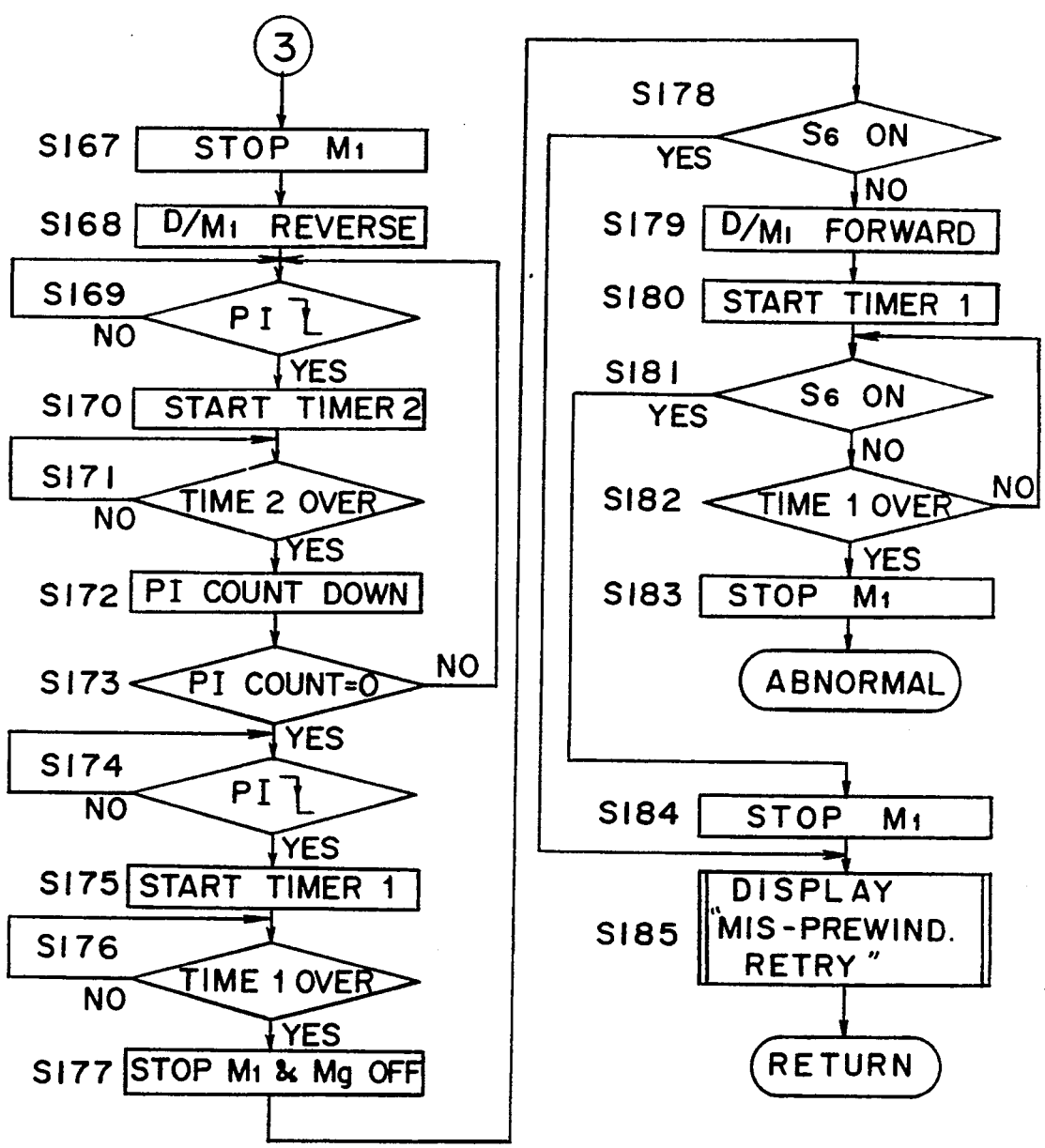
Figure 21A:
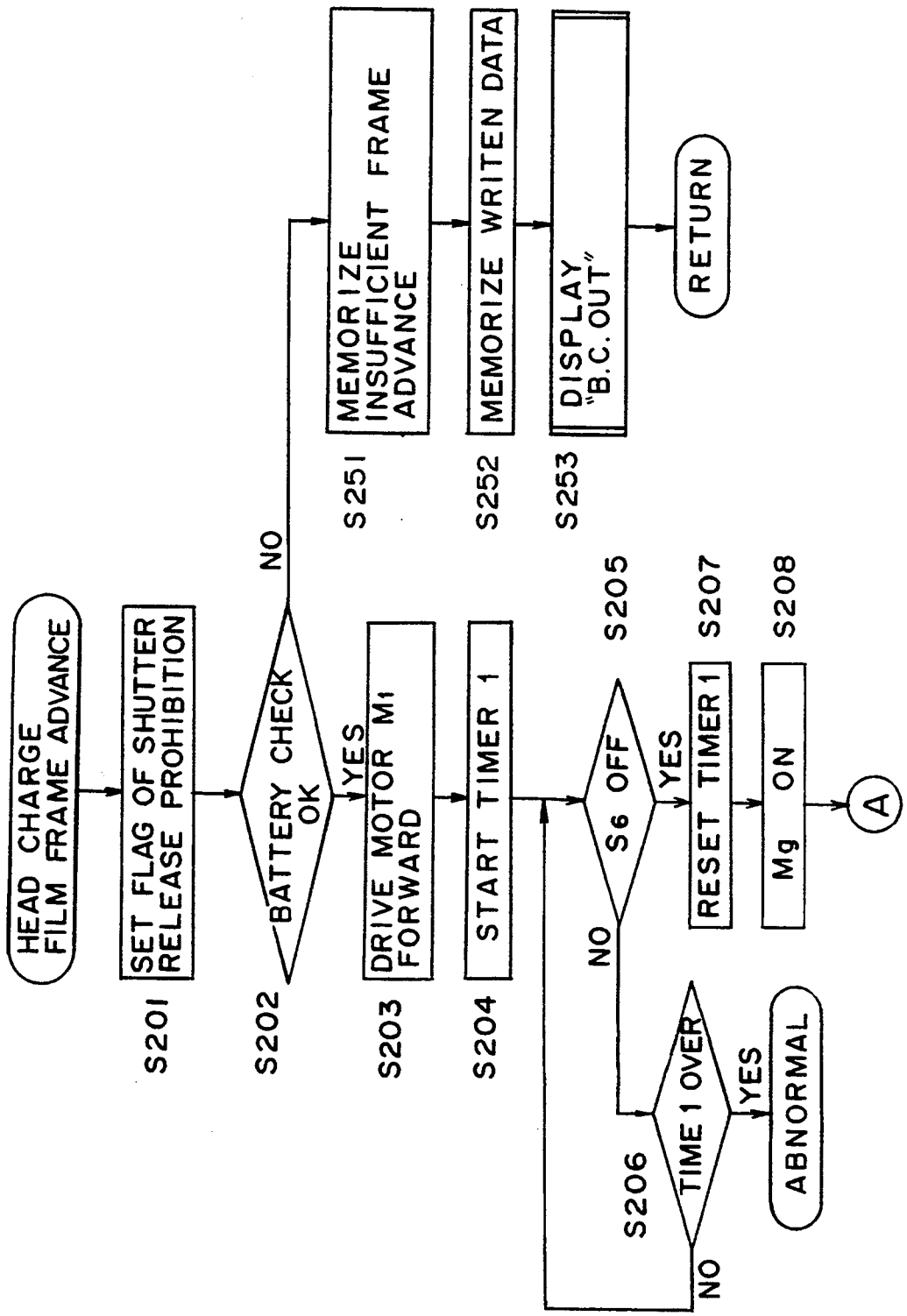
FIGS. 21(a), 21(b) are flowcharts showing an operation for winding a film by one frame around the cartridge spool and charging a magnetic head to be performed in the camera according to the embodiment.
Figure 21B:
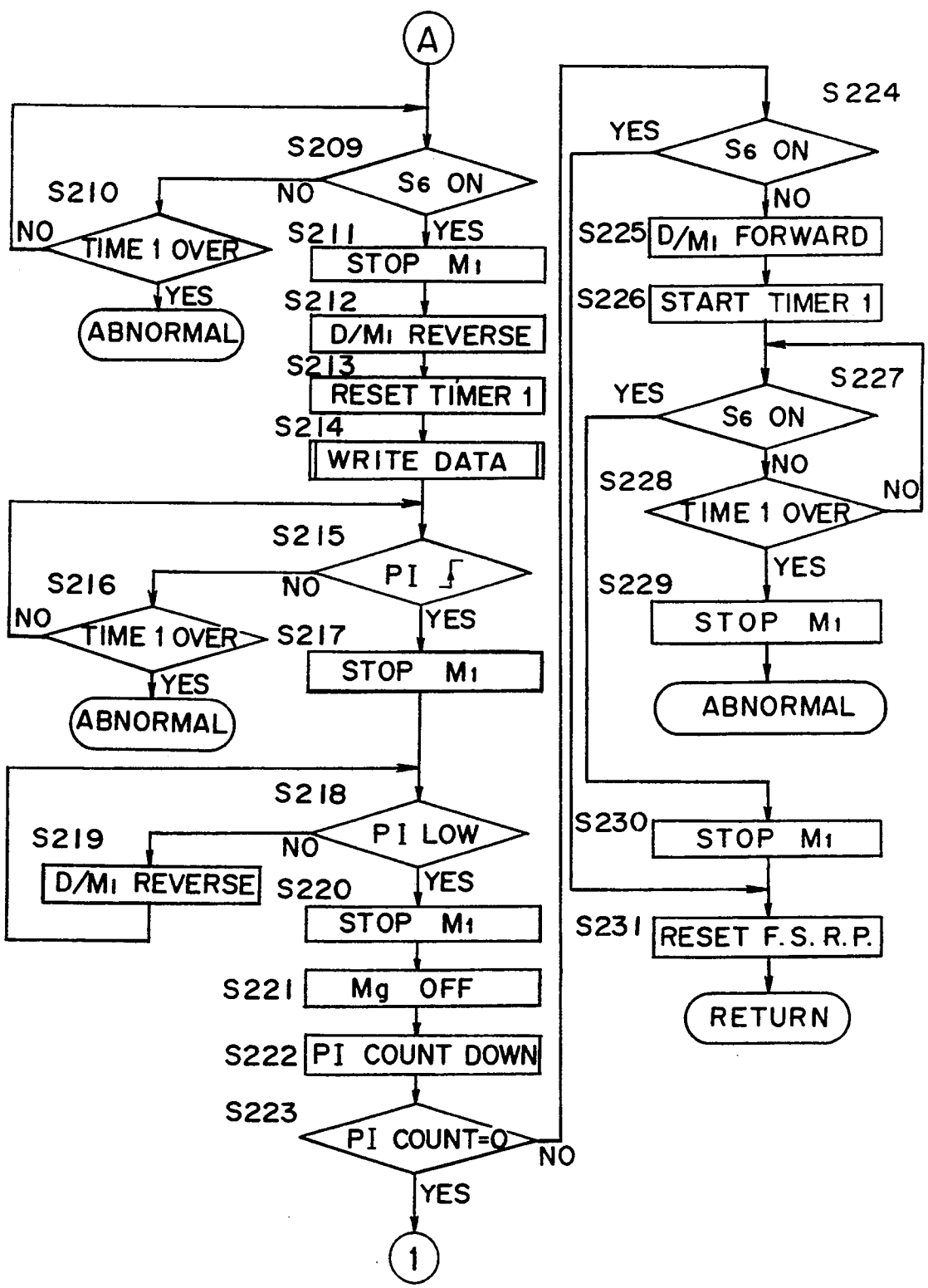
Figure 22:
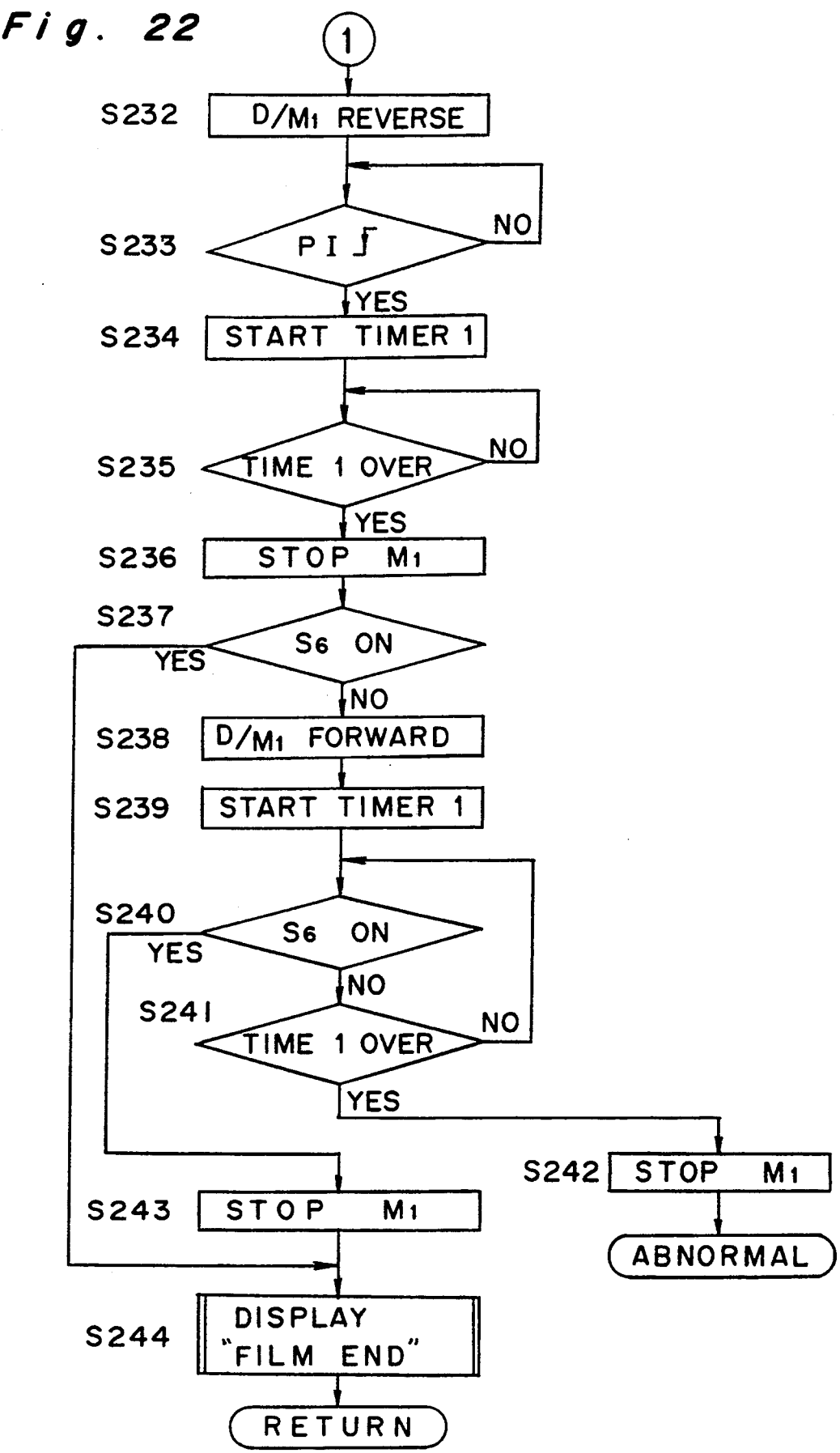

In performing the pre-winding operation according to the subroutine shown in FIGS. 18(a) to 18(c), first, the flag of shutter release prohibition is set at step S101 so that the shutter release operation is not executed even if the release button 8 is pressed by mistake. The substantial pre-winding operation is started after the automatic initial loading of the film is completed. Therefore, in order to execute the automatic initial loading, it is decided at step S102 whether or not the charge cam position detecting switch $S_6$ is ON. The switch $S_6$ is turned on when the charge cam 71 is at the initial position. If yes, at step S103, the first motor $M_1$ is rotated forward to perform the initial loading. That is, the first sun gear 62 shown in FIG. 8 and the second sun gear 63 shown in FIG. 9 are rotated in the counterclockwise direction. At this time, the force of the first motor $M_1$ is transmitted to the unlocking lever 77 in the clockwise direction via the friction mechanism (F) positioned between the sun gear and the unlocking lever 77. Therefore, the unlocking lever 77 does not engage the lock lever 75. The lock lever 75 engages the lower end of the control lever 74, thus holding the control lever 74 at its upper position as shown in FIG. 8. When the control lever 74 is at the upper position and the first sun gear 62 rotates in the counterclockwise direction, the first planetary gear 64 engages the pre-winding gear 67, thus transmitting the force of the first motor $M_1$ to the camera spool 69, but not to the first charge gear 68. Accordingly, the charge cam 71 remains at the initial position, thus not pressing the pad lever 72 upward. Therefore, the pad 73 and the magnetic head HD are spaced from each other at a certain interval with the film feeding path provided therebetween. The force of the first motor $M_1$ is transmitted from the second sun gear 63 to the fork gear 83 via the third planetary gear 66. As a result, the cartridge spool 11 is driven to feed the film contained therein from the cartridge 9 to the camera spool 69 through the film passing slit 15. The film does not contact the magnetic head HD or the pad 73. When the film is fed out from the film passing slit 15 normally, the leading end of the film passes through the photointerrupter PI before a predetermined period of time elapses. At this time, the level of a signal outputted therefrom changes from low to high. In order to detect this, a first timer starts counting at step S104 after it is decided at step S103 that the first motor $M_1$ rotates forward, and it is decided at step S105 whether or not the signal outputted from the photointerrupter PI has changed from the low level to the high level. The level of the signal outputted from the photointerrupter PI becomes high when light projected from the light projecting portion to the light receiving portion is intercepted by the film and low when the film is not positioned between the light projecting portion and the light receiving portion or when light reaches the light receiving portion through the perforation of the film. The first timer is contained in the microcomputer CP and the predetermined period of time is set therein. It is decided at step S186 whether or not the predetermined period of time has elapsed. If the level of the signal outputted from the photointerrupter PI does not become high in the predetermined period of time, it is decided that the cartridge 9 has not been loaded into the cartridge chamber 16 appropriately. Therefore, the routine subsequent to step S142 is executed so that the cartridge 9 is inserted again into the cartridge chamber 16.

The peripheral speed of the camera spool 69 is set to be faster than that of the fork 23. Therefore, the winding of the film around the camera spool 69 allows the pre-winding operation to be started. At this time, the rotational speed of the fork gear 83 is faster than that of the third planetary gear 66. Therefore, the third planetary gear 66 disengages from the fork gear 83 while the third planetary gear 66 is revolving in the clockwise direction round the second sun gear 63.

Figure 10:
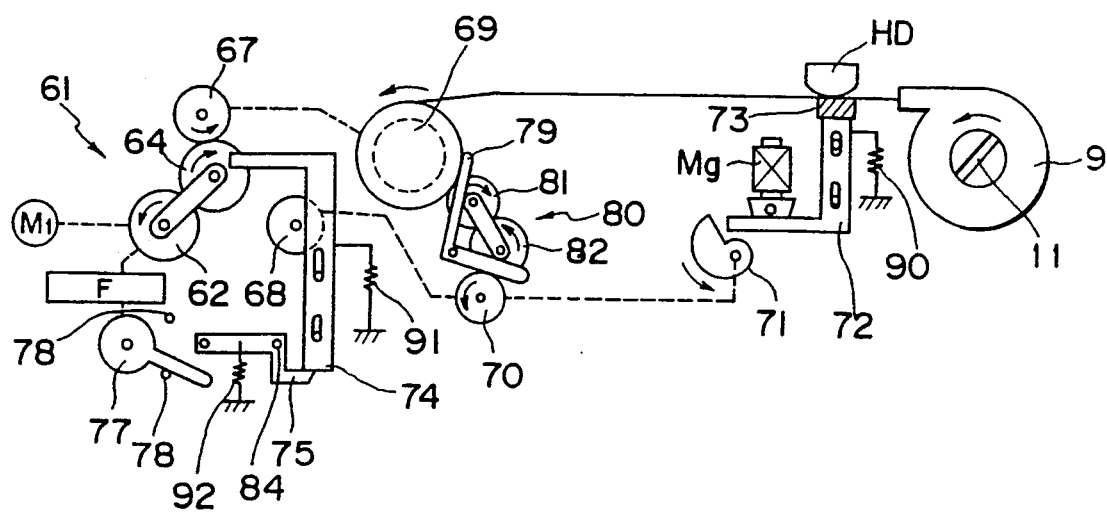

When the film is wound around the camera spool 69, the film presses out the wind detecting lever 79 from the groove of the spool 69 as shown in FIG. 10. In this condition, the wind detecting lever 79 allows the fourth planetary gear 82 of the second planetary gear mechanism 80 to revolve in the clockwise direction round the third sun gear 81. Therefore, the fourth planetary gear 82 engages the second charge gear 70. As a result, the rotational force of the camera spool 69 is transmitted to the charge cam 71 via the second charge gear 70. That is, when the pre-winding operation starts as a result of the normal winding of the film around the camera spool 69, the charge cam 71 starts rotating. Therefore, if it is decided at step S105 that the signal outputted from the photointerrupter PI changes from the low level to the high level in the predetermined period of time, the charge cam 71 moves from the initial position within the predetermined period of time after the pre-winding operation starts. Accordingly, the first timer is reset at step S106 to start counting time. It is decided at step S107 whether or not the charge cam position detecting switch $S_6$ is turned off within the predetermined period of time. If no, it is decided that the film has not been wound around the camera spool 69 normally. Therefore, the program goes from step S108 to step S128, and the routine subsequent to step S128 is executed so that the cartridge 9 is inserted again into the cartridge chamber 16. If yes at step S107, due to the movement of the charge cam 71, the pad 73 brings the magnetic surface of the film into contact with the magnetic head HD in order to decide whether all frames have not been exposed, or some frames have already been exposed for photographing by reading the magnetic data of the film in pre-winding the film. Whether the film has been wound around the camera spool 69 normally or abnormally in the pre-winding operation can be decided by monitoring whether or not the film has progressed by one frame in a predetermined period of time required for reading the magnetic data of one frame. At step S109, the first timer is reset again. At step S110, the counter of the photointerrupter PI is reset to detect the rearmost frame of the film not exposed by means of detecting perforations. At step S111, the magnet Mg is energized so that the pad 73 keeps pressing the film against the magnetic head HD. At step S112, the magnetic data of the film is read. According to the pre-winding system, the unexposed frames pass through the photointerrupter PI prior to the exposed frames in the pre-winding operation. Therefore, when an exposed frame is detected, the frame which has passed through the photointerrupter PI by one frame prior to the passing of the exposed frame should be used. In order to detect the frame which is to be used first, it is decided at step S113 whether or not each frame has been exposed already. If it is decided that the frame, the data of which had been read has not been exposed, it is decided at step S114 whether or not the signal outputted from the photointerrupter PI has changed from the high level to the low level in order to decide whether or not the photointerrupter PI has detected the rear perforation of the frame before the predetermined period of time reset in the first timer at step S109 elapses. If the level of the signal has changed to low, the second timer is started to count time at step S115 in order to detect the leading perforation of the following frame in the predetermined period of time and at step S116, the number of perforations detected by the photointerrupter PI in the predetermined period of time is counted by means of the number of pulses outputted therefrom. After the predetermined period of time elapses, it is decided at step S118 whether or not the number of pulses is more than two. As described previously, three perforations are adjacently formed in the vicinity of the rear end of the rearmost frame. Therefore, when all the frames are fed out from the cartridge 9, the photointerrupter PI detects the three perforations. If the film is new, it can be decided at step S118 whether or not the pre-winding operation has terminated. If the frame is not the rearmost frame, the number of pulses is two. Therefore, the counter provided for counting the number of pulses outputted by the photointerrupter PI is updated by incrementing its counting number by one at step S119. Then, the first timer is reset at step S120 in order to read the magnetic data of the following frame. Then, the program returns to step S112.

If it is decided at step S113 that the frame has been exposed already, apparently, all the frames subsequent to the exposed frame have already been exposed. Therefore, the winding of the film around the camera spool 69 should be terminated. If it is decided at step S118 that the number of pulses outputted from the photointerrupter PI is more than two, the winding operation of the film around the camera spool 69 terminates because all the frames have been pre-wound. Accordingly, in these two cases, the program goes from step S113 or step S118 to step S125 at which the first timer stops counting time and the first motor $M_1$ is stopped at step S126.

Then, at step S127 and steps subsequent thereto, the first frame is set in the photographable position.

If the battery voltage has dropped during the pre-winding operation of the film around the camera spool 69, there is a possibility that the rear perforation of the frame being wound around the camera spool 69 does not reach the photointerrupter PI within the predetermined period of time due to the shortage of the driving force of the first motor $M_1$. Accordingly, if it is decided at step S114 that the signal outputted from the photointerrupter PI does not change from the high level to the low level within the predetermined period of time, a battery check is made at step S122. If a drop of the battery voltage is found, the condition of the pre-winding operation is stored in the non-volatile memory of the microcomputer CP at step S123, and the data "B.C. OUT" is displayed at step S124. Then, the microcomputer CP waits until data is inputted thereto at step S002 of the main routine. In this case, it is necessary to replace the old battery with a new one. If it is decided at step S122 that the battery voltage is enough, there is a possibility that a mechanical failure has happened. Therefore, the program goes to step S167 shown in FIG. 20 at which the first motor $M_1$ is stopped to suspend the pre-winding operation.

Figure 11:
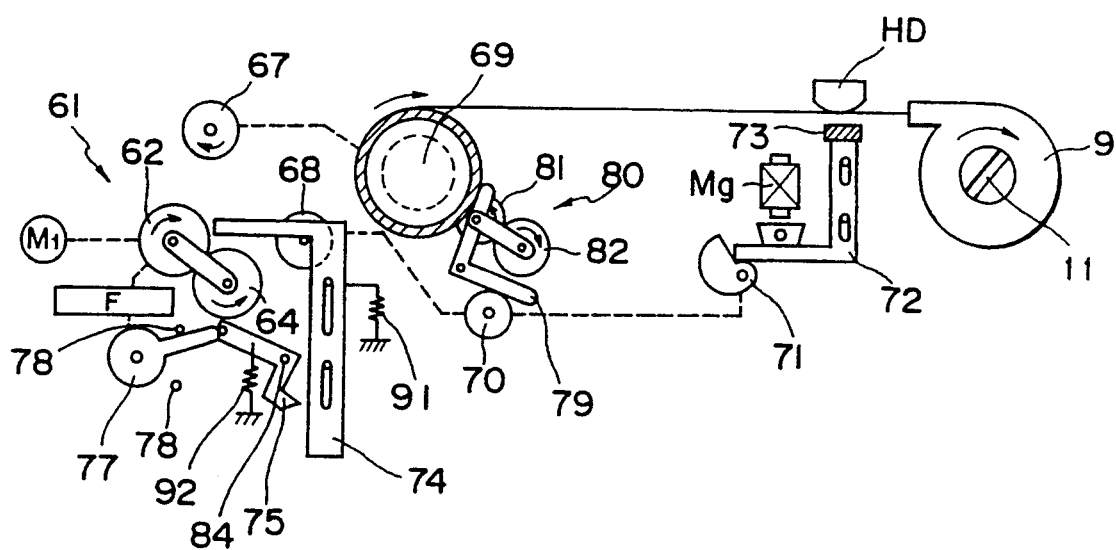

In setting the first frame of unexposed frames in the photographing position after the pre-winding operation is completed, the first motor $M_1$ is stopped at step S126, and then, the first motor $M_1$ is rotated reversely at step S127. In this case, as shown in FIG. 11, the first sun gear 62 rotates in the clockwise direction, thereby revolving the first planetary gear 64 in the clockwise direction round the first sun gear 62. As a result, the first planetary gear 64 disengages from the pre-winding gear 67. The second sun gear 63 rotates in the clockwise direction as show in FIG. 15. Accordingly, with the second planetary gear 65 engaging the fork gear 83, the second planetary gear 65 revolves in the clockwise direction round the second sun gear 63. As a result, the fork gear 83 rotates in the clockwise direction, thereby rotating the cartridge spool 11 in the film winding direction.

Figure 12:
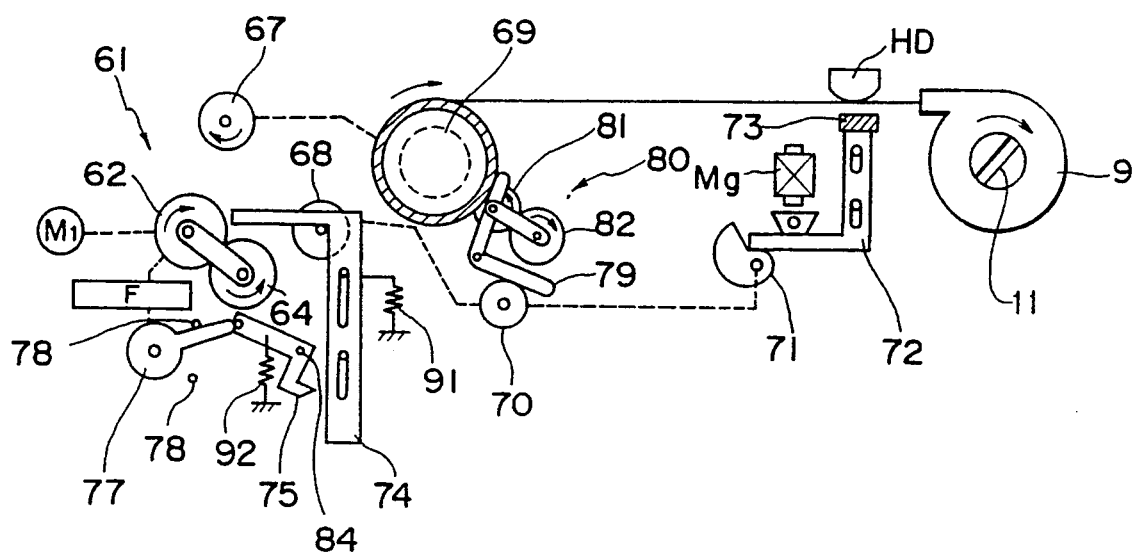
Figure 13:
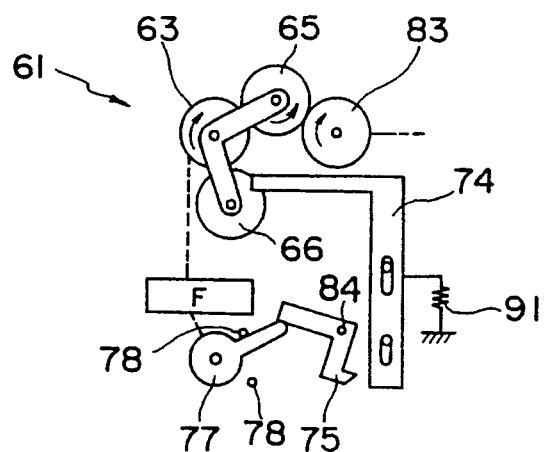

When the film starts traveling toward the cartridge 9, the second timer starts counting time at step S151 in order to ignore the rear perforation of the exposed frame which has passed through the photointerrupter PI immediately before the first motor $M_1$ is reversed. At step S152, the microcomputer CP waits until the predetermined period of time required for winding exposed frames around the cartridge spool 11 elapses. After the predetermined period of time elapses, in order to detect that the rear perforation of the rearmost exposed frame passes through the photointerrupter PI, it is decided at step S153 whether or not the signal outputted from the photointerrupter PI has changed from the low level to the high level. If yes, the program goes to step S154 at which the first motor $M_1$ is stopped and the winding of the film around the cartridge spool 11 is also stopped. This is because it is decided with the subsequent level change of the signal from high to low that the leading perforation of an unexposed frame is at the photointerrupter PI. Owing to the operation at step S154, the leading perforation of the unexposed frame can be prevented from passing through the photointerrupter PI. But it is possible that at step S154, the leading perforation of the unexposed frame is already at the photointerrupter PI because the interval between adjacent frames is short and inertia force may have possibly rotated the first motor $M_1$ slightly. Therefore, it is decided at step S155 whether or not the level of the signal outputted from the photointerrupter PI is low. If the level of the signal is not at the low level at step S155, the leading perforation has not been at the photointerrupter PI. Therefore, at step S156, the first motor $M_1$ is instantaneously reversed to wind the film little by little so that the leading perforation of the unexposed frame advances to the position of photointerrupter PI. Then, at step S157, the first motor $M_1$ is stopped. In this condition, the position of the film is appropriate, however, it is necessary to write photographing information to the magnetic surface of the film after a photograph is taken. To this end, the charge cam 71 is required to be at the initial position. Therefore, it is decided at step S158 whether or not the charge cam position detecting switch $S_6$ is ON. If yes, the magnet Mg is deenergized at step S165 to move the pad 73 away from the film feeding path as shown in FIG. 11. Then, at step S166, the release prohibition flag is reset to enable a shutter release operation. Then, the program goes to step S005 of the main routine. If the switch $S_6$ is OFF at step S158, an operation for setting the charge cam 71 at the initial position is performed. That is, the first motor $M_1$ is rotated forward at step S159, and, the first timer starts counting time at step S160, and it is decided at step S161 whether or not the switch $S_6$ is turned on within the predetermined period of time. At this time, since the first sun gear 62 rotates in the clockwise direction at step S127, the unlocking lever 77 rotates in the counterclockwise direction through the friction mechanism (F), thus pressing the end of the lock lever 75 upward. As a result, the lock lever 75 disengages from the lower end portion of the control lever 74. Accordingly, the spring 91 moves the control lever 74 downward from the upper position as shown in FIG. 10 to the lower position as shown in FIG. 11. Therefore, the first planetary gear 64 engages the first charge gear 68 as shown in FIG. 12, thus driving the charge cam 71. Since neither the second planetary gear 65 nor the third planetary gear 66 engages the fork gear 83 as shown in FIG. 13, the cartridge spool 11 is not driven. If the switch $S_6$ is turned on in the predetermined period of time, the first motor $M_1$ is stopped at step S164, and the magnet Mg is deenergized at step S165, and then, the release prohibition flag is reset at step S166 so as to enable a shutter release operation. Then, the program goes to step S005 of the main routine. Since the control lever 74 is interlocked with the cover 10 of the cartridge chamber 16, the control lever 74 is returned to the upper position by opening the cover 10 to insert the cartridge 9 into the cartridge chamber 16.

If the perforation of the subsequent frame is not detected in the pre-winding operation and if it is decided at step S122 that the battery voltage is enough the pre-winding operation is stopped due to a mechanical failure. In this case, the program goes from step S122 to step S167 shown in FIG. 20 at which the first motor $M_1$ is stopped to suspend the pre-winding operation. Then, at step S168, the first motor $M_1$ is reversed until the level of the signal outputted from the photointerrupter PI changes from high to low to return the rear perforation of the frame to the photointerrupter PI. If it is decided at step S169 that the level of the signal outputted from the photointerrupter PI has changed from high to low, the second timer starts counting time at step S170 and the film is rewound by one frame into the cartridge 9. Then, at step S172, the counter of the photointerrupter PI is updated by decrementing its counting number by one. It is decided at step S173 whether or not the number counted by the counter is zero. The processing of step S169 through step S173 is repeated until the number counted by the counter is zero. Thus, all frames wound around the camera spool 69 are rewound around the cartridge spool 11 before the pre-winding operation is stopped. If it is decided at step S173 that the number counted by the counter is zero, it is decided at step S174 whether or not the level of the signal outputted from the photointerrupter PI changes from high to low. The reverse rotation of the first motor $M_1$ continues until the level of the signal changes to the low level, i.e., until the leading end of the film passes through the photointerrupter PI. If it is decided at step S174 that the level of the signal has changed to low, the first timer starts counting at step S175 and the first motor $M_1$ continues the reverse rotation in the predetermined period of time until all the frames are rewound up into the cartridge 9. If it is decided at step S176 that the predetermined period of time elapses, the first motor $M_1$ is stopped and the magnet Mg is deenergized at step S177. In order to resume the pre-winding operation, the operation for setting the charge cam 71 at the initial position is executed at step S178 through step S184. This operation is substantially the same as that to be executed at step S158 through step S164. But if it is decided at step S178 that the charge cam position detecting switch $S_6$ is ON, the program goes to step S185 at which the data "MIS-PREWIND, RETRY", meaning that reloading of cartridge is necessary because the pre-winding operation has failed, is displayed. Then, the program returns to step S002 of the main routine.

If the initial loading is not appropriately carried out, the program skips from step S108 to step S128. In this case, in order to resume the pre-winding operation, the first motor $M_1$ is stopped at step S128, and the first motor $M_1$ is reversed at step S129 in order to rewind up the film into the cartridge 9. Then, at step S130 through step S150, operations similar to those to be executed at step S174 through step S185 are carried out. At step S142, the first motor $M_1$ is stopped, but it is unnecessary to deenergize the magnet Mg since the magnet Mg is OFF in the initial loading.

The detail of an operation for winding one frame around the cartridge spool 11 and charging the magnetic head to be executed at step S021 of the main routine is described below with guiding to FIG. 8 through FIG. 15, 16, 21, and 22.

Upon start of the execution of the subroutine in connection with the operation for winding the film by one frame around cartridge spool 11 and charging the magnetic head HD, first, the release prohibition flag is set at step S201 so that a shutter release operation is not carried out even though the release button 8 is depressed by mistake. In order to wind the film by one frame around the cartridge spool 11 while the magnetic head HD is being charged, the battery is required to have a sufficient voltage. Therefore, a battery check is made at step S202 before the above operation is performed. If the battery voltage is insufficient, at step S251, the nonvolatile memory of the microcomputer CP stores data indicating that the operation for winding the film by one frame has not yet executed and data written for the winding of the next one frame and at steps S251 and S252, and thereafter, the data "B.C.OUT" is displayed at step S253. Then, the program returns to step S002 of the main routine. In this case, it is necessary to replace the old battery with a new one.

Figure 14:
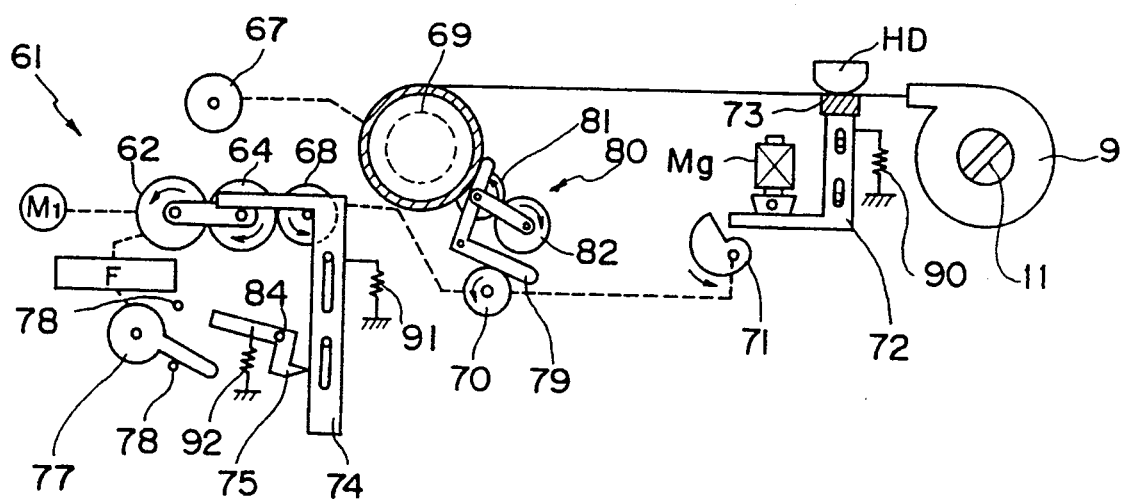
Figure 15:
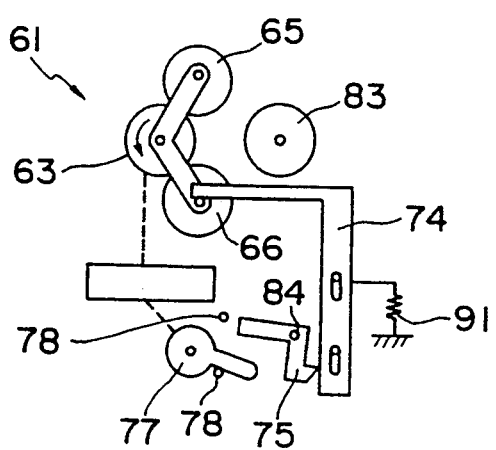

If it is decided at step S202 that the battery has a sufficient voltage, the first motor $M_1$ is rotated forward at step S203 in order to start the operation for charging the magnetic head HD. At this time, as shown in FIG. 12, the control lever 74 is already in the lower position in the pre-winding operation and the first planetary gear 64 engages the first charge gear 68 with the counterclockwise rotation of the first sun gear 62. The rotation of the first motor $M_1$ is transmitted to the charge cam 71 via the first charge gear 68 and the second charge gear 70. In order to monitor whether or not the above operation is normally accomplished within the predetermined period of time after the start of the forward rotation of the first motor $M_1$, the first timer starts counting time at step S204 and it is decided at step S205 whether or not the charge cam position detecting switch $S_6$ is turned off. If the switch $S_6$ is not turned off after the predetermined period of time elapses, all the operations are suspended because a failure has occurred. If the switch $S_6$ is turned off at step S205, it is decided that the charge cam 71 has started operation. Therefore, the first timer is reset at step S207 and the magnet Mg is energized at step S208 in order to keep charging the magnetic head HD, then, it is decided at steps S209 and S210 whether or not the charge cam 71 returns to the initial position within the predetermined period of time. If the switch $S_6$ is not turned on within the predetermined period of time, all the operations are stopped because it is considered that a failure has occurred. If the switch $S_6$ is turned on within the predetermined period of time, the first motor $M_1$ is stopped at step S211 because the charge cam 71 has returned to the initial position as a result of the normal operation for transmitting the force of the first motor $M_1$ to the charge cam 71. Then, at step S212, the first motor $M_1$ is reversed to start the winding of the film by one frame. As shown in FIG. 14, with the reverse rotation of the first motor $M_1$, the first planetary gear 64 revolves in the clockwise direction round the first sun gear 62 from the position shown in FIG. 12, thus disengaging from the first charge gear 68. As a result, the second planetary gear 65 engages the fork gear 83 as shown in FIG. 15. Thus, the fork 23 is rotated in the direction in which the film is rewound around the cartridge spool 11. Since the fork 23 is rotated to rewind one frame, the first timer is reset at step S213, and at step S214, photographing information is written to the magnetic surface of the film while the operation for winding the film is being executed. It is decided at step S215 whether or not the level of the signal outputted from the photointerrupter PI changes from low to high within the predetermined period of time. That is, whether or not the rear perforation of the exposed frame passes the photointerrupter PI. If the level of the signal does not change to high in the predetermined period of time, i.e., if it is decided at step S216 that the predetermined period of time has elapsed, it is considered that one frame has not been wound around the cartridge spool 11 in the predetermined period of time. Since it is decided at step S202 that the battery voltage has not dropped, it is considered that a failure has occurred. Therefore, all the operations are stopped. If it is decided at step 215 that the level of the signal has changed to high, the first motor $M_1$ is stopped at step S217, and it is decided at step S218 whether or not the level of the signal changes to low. That is, if the film has been wound slightly by inertia force after the first motor $M_1$ is stopped, there is a possibility that the leading perforation of the following unexposed frame is at the photointerrupter PI. If it is decided that the leading perforation of the following unexposed frame is at the photointerrupter PI, i.e., if the level of the signal has changed to low, the first motor remains stopped at step S220. If the level of the signal remains high, the first motor $M_1$ is instantaneously reversed to advance the film little by little at step S219 so that the leading perforation of the following unexposed frame is exactly at the photointerrupter PI. Then, at step S220, the first motor $M_1$ is stopped, and at step S221, the magnet Mg is deenergized to move the pad 73 away from the film feeding path as shown in FIG. 14. At step S222, the counter of the photointerrupter PI is updated by decrementing its counting number by one. It is decided at step S223 whether or not the counting number of the counter is zero. If the counting number is zero, the number of remaining frames is zero. Therefore, the first motor $M_1$ is reversed at step S232 shown in FIG. 22 to wind remaining frames. The same operations as those performed at step S174 through step S184 are carried out from step S233 through step S241. At step S244, the data "FILM END" is displayed. Then, the program returns to step S002 of the main routine. Since all the frames have been exposed, the film cartridge 9 is taken out from the cartridge chamber 16.

If it is decided at step S223 that the counting number of the counter of the photointerrupter PI is not zero, i.e., if any frames have not exposed, the same operations as those performed at step S158 through step S166 are carried out from step S224 through step S231. Since the magnet Mg has been already deenergized at step S221, it is unnecessary to perform the operation for deenergizing the magnet Mg. The program returns to step S002 of the main routine.

Figure 23:
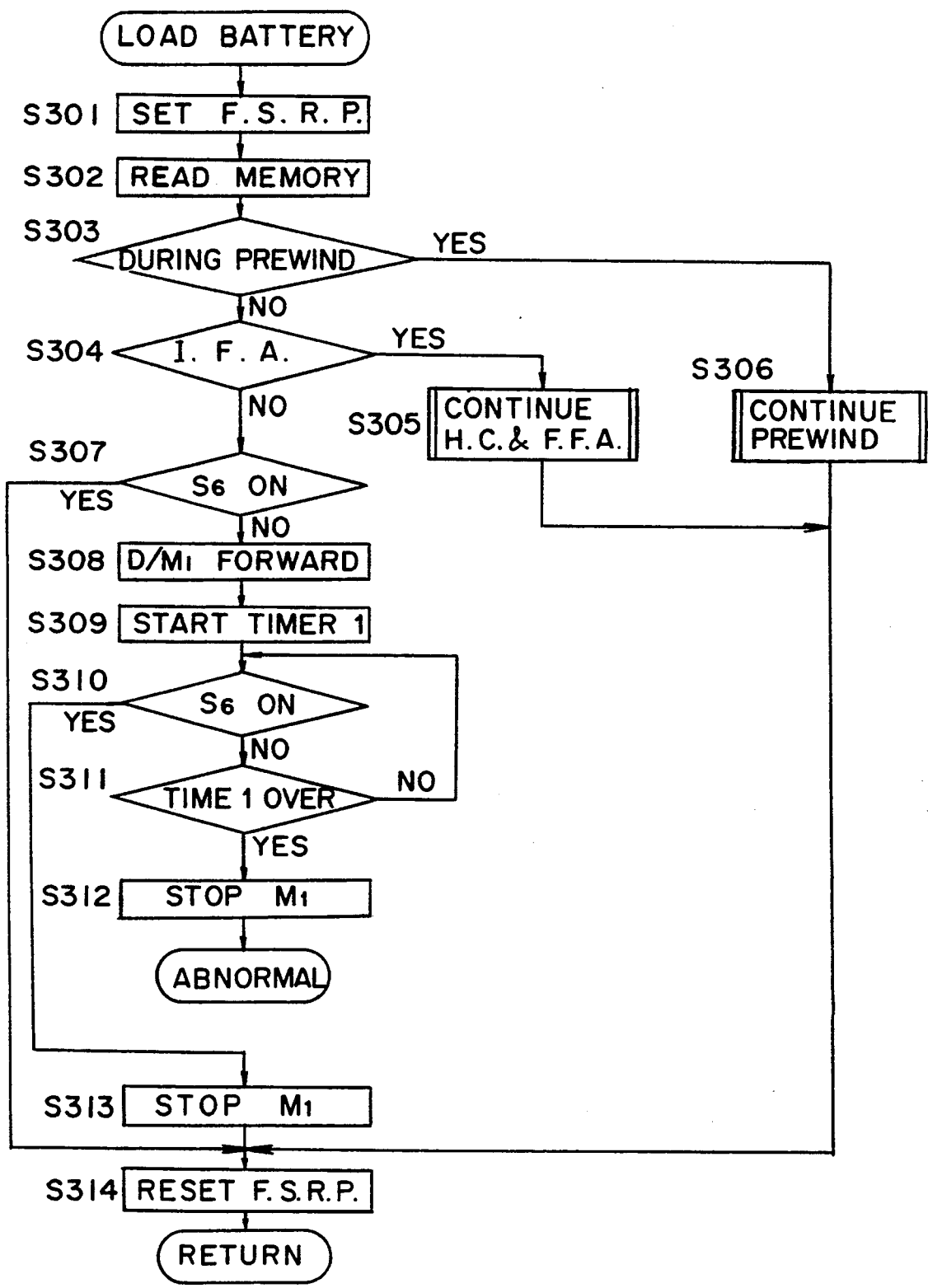
FIG. 23 is a flowchart showing the subroutine of a battery loading operation to be performed in the camera according to the embodiment.

The battery loading operation to be performed at step S001 of the main routine is described with guiding to FIG. 23.

Upon start of the execution of the battery loading routine, the release prohibition flag is set at step S301. If the operation for pre-winding the film or winding one frame is suspended due to the drop of the battery voltage, the operation can be resumed because the non-volatile memory stores the operation being performed at the time of the drop of the battery voltage. Therefore, at step S302, the information stored in the memory is read. If it is decided according to the information that the drop of the battery voltage has occurred during the pre-winding operation, the pre-winding operation is resumed from step S303 through step S306. If it is decided according to the information that the drop of the battery voltage has occurred during the operation for winding one frame, the operation for winding one frame is resumed from step S304 to step S305. The release prohibition flag is reset at step S314 in both the operation for pre-winding the film and the operation for winding one frame. Then, the program returns to step S002 of the main routine.

If a battery is loaded into the camera body during any operations except the above operations, the same operations as those to be executed from step S158 through step S164 are executed from step S307 through step S313. At step S314, the release prohibition flag is reset. Then, the program returns to step S002 of the main routine. If it is decided at step S307 that the switch $S_6$ is ON, the program skips to step S314 because the magnet has not been energized.

Although the present invention has been fully described in connection with the preferred embodiments thereof with reference guiding to the accompanying drawings, it is to be noted that various changes and modifications are apparent to those skilled in the art. Such changes and modification are to be understood as included within the scope of the present invention as defined by the appended claims unless they depart therefrom.

What is claimed is:

1. An apparatus using a film having a magnetic surface for recording magnetic data thereon comprising:
    a magnetic head for writing magnetic data onto said magnetic surface or for reading said magnetic data recorded on said magnetic surface;
    a pad relatively movable with respect to said magnetic head so that said film can be inserted between said magnetic head and said pad;
    driving means for generating driving force to feed said film between said magnetic head and said pad; and
    control means, energized by the driving force generated by said driving means, for reducing an interval between said magnetic head and said pad so that said film is sandwiched between said magnetic head and said pad.

2. An apparatus as claimed in claim 1, further comprising:
    an electromagnet for keeping said film sandwiched between said magnetic head and said pad upon energization; and
    electromagnet control means for energizing said electromagnet in response to a writing operation or a reading operation of said magnetic data performed by said magnetic head and deenergizing said electromagnet after a feeding of said film is completed by said driving means.

3. An apparatus as claimed in claim 1, further comprising:
    urging means for urging at least one of said magnetic head and said pad in a direction in which said magnetic head and said pad depart from each other;
    wherein said control means reduces said interval against force of said urging means.

4. An apparatus using a film having a magnetic surface for recording magnetic data thereon comprising:
    a magnetic head for writing magnetic data onto said magnetic surface and for reading said magnetic data recorded on said magnetic surface;
    a pad relatively movable with respect to said magnetic head so that said film can be inserted between said magnetic head and said pad;
    first driving means for generating driving force for feeding said film between said magnetic head and said pad;
    supporting means for supporting at least one of said magnetic head and said pad so as to vary a relative interval between said magnetic head and said pad;
    second driving means for reducing said relative interval between said magnetic head and said pad by means of force of said first driving means so that said film is sandwiched between said magnetic head and said pad; and
    unlocking means for releasing said film from being sandwiched between said magnetic head and said pad by separating the magnetic head and the pad in response to termination of writing or reading operation of said magnetic data performed by said magnetic head.

* * * * *